(12) United States Patent
Park et al.

(10) Patent No.: US 11,356,160 B2
(45) Date of Patent: Jun. 7, 2022

(54) METHOD FOR TRANSMITTING AND RECEIVING SIGNAL IN WIRELESS LAN SYSTEM AND APPARATUS THEREFOR

(71) Applicant: LG ELECTRONICS INC., Seoul (KR)

(72) Inventors: Sungjin Park, Seoul (KR); Jinmin Kim, Seoul (KR); Sunwoong Yun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 16/960,011

(22) PCT Filed: Dec. 28, 2018

(86) PCT No.: PCT/KR2018/016836
§ 371 (c)(1),
(2) Date: Jul. 2, 2020

(87) PCT Pub. No.: WO2019/135557
PCT Pub. Date: Jul. 11, 2019

(65) Prior Publication Data
US 2021/0067218 A1    Mar. 4, 2021

Related U.S. Application Data

(60) Provisional application No. 62/639,419, filed on Mar. 6, 2018, provisional application No. 62/635,542, filed (Continued)

(51) Int. Cl.
*H04L 27/28* (2006.01)
*H04B 7/06* (2006.01)
(Continued)

(52) U.S. Cl.
CPC ......... *H04B 7/0617* (2013.01); *H04B 7/0417* (2013.01); *H04B 7/0452* (2013.01); *H04B 7/2643* (2013.01); *H04W 84/12* (2013.01)

(58) Field of Classification Search
CPC ................ H04L 1/0618; H04L 5/1469; H04L 2025/03426; H04B 7/0695; H04B 7/0417;
(Continued)

(56) References Cited

U.S. PATENT DOCUMENTS 9,344,165 B2 * 5/2016 Wang ..................... H04B 7/088
2011/0211474 A1 * 9/2011 Koo ................... H04L 25/0204
370/252
(Continued)

FOREIGN PATENT DOCUMENTS

KR    20140097104    8/2014
WO    2011059248    5/2011

OTHER PUBLICATIONS

PCT International Application No. PCT/KR2018016836, International Search Report dated Apr. 4, 2019,4 pages.
(Continued)

*Primary Examiner* — Khai Tran
(74) *Attorney, Agent, or Firm* — Lee, Hong, Degerman, Kang & Waimey PC

(57) ABSTRACT

Proposed are a method and an apparatus for transmitting a signal by performing MIMO beamforming in a wireless LAN system. Specifically, a first STA performs MIMO beamforming during a second STA and TDD-based SP. The first STA transmits a signal to the second STA on the basis of a result of the MIMO beamforming. The SP includes a plurality of TDD slots. The MIMO beamforming includes a first sub-step and a second sub-step. In the first sub-step, after receiving a first MIMO beamforming setup frame from the second STA, the first STA transmits a second MIMO
(Continued)

beamforming setup frame in the first allocated TDD slot among the TDD slots allocated to the first STA. In the second sub-step, after receiving a first MIMO beamforming feedback frame from the second STA, the first STA transmits a second MIMO beamforming feedback frame in a first allocated TDD slot among the TDD slots allocated to the first STA.

12 Claims, 29 Drawing Sheets

Related U.S. Application Data on Feb. 27, 2018, provisional application No. 62/634,184, filed on Feb. 22, 2018, provisional application No. 62/613,062, filed on Jan. 3, 2018.

(51) Int. Cl.
| | | |
|---|---|---|
| *H04B 7/0417* | (2017.01) | |
| *H04B 7/0452* | (2017.01) | |
| *H04B 7/26* | (2006.01) | |
| *H04W 84/12* | (2009.01) | |

(58) Field of Classification Search
CPC .... H04B 7/0617; H04B 7/0619; H04B 17/24; H04W 72/0446; H04W 72/046; H04W 84/12; H04W 16/28
USPC .......................... 375/260.262, 367; 370/333
See application file for complete search history.

(56) References Cited

U.S. PATENT DOCUMENTS

| | | | |
|---|---|---|---|
| 2017/0048775 A1* | 2/2017 | Kim | H04W 76/18 |
| 2019/0123798 A1* | 4/2019 | Lou | H04B 7/0486 |
| 2021/0126678 A1* | 4/2021 | Huang | H04B 7/0413 |

OTHER PUBLICATIONS

Lei Huang, et al., "SU-MIMO beamforming optimization", doc.: IEEE 802.11-17/1233r1, Dec. 2017, 9 pages.

Kome Oteri, et al., "Hybrid Beamforming Protocol Design Details", doc.: IEEE 802.11-17/1689r1, Nov. 2017, 17 pages.

Payam Torab, et al., "Beamforming protocol differences for mmWave Distribution Networks", doc.: IEEE 802.11-17/1841r0, Dec. 2017, 15 pages.

* cited by examiner

FIG. 9

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

FIG. 17

| Element ID | Length | Element ID Extension | EDMG Allocation Control | Number of Allocations | Channel Allocations 1 | ... | Channel Allocations N |
|---|---|---|---|---|---|---|---|
| 1 | 1 | 1 | 1 | 1 | 5 or 20 | | 5 or 20 |

Octets:

FIG. 18

| Element ID | Length | Element ID Extension | Slot Structure Control | Slot Structure Start Time | TDD SP Block Duration | Slot Structure |
|---|---|---|---|---|---|---|
| 1 | 1 | 1 | 4 | 4 | 2 | M |

Octets:

METHOD FOR TRANSMITTING AND RECEIVING SIGNAL IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2018/016836, filed on Dec. 28, 2018, which claims the benefit of U.S. Provisional Application No. 62/613,062, filed on Jan. 3, 2018, 62/634,184, filed on Feb. 22, 2018, 62/635,542, filed on Feb. 27, 2018, and 62/639,419, filed on Mar. 6, 2018, the contents of which are all hereby incorporated by reference herein in their entireties.

BACKGROUND

Field

The disclosure relates to a method for transmitting and receiving a signal in a wireless local area network (WLAN) system and, more particularly, to a method and a device for performing SU-MIMO beamforming available for a TDD SP structure.

Related Art

A standard for the wireless LAN technology is being developed as an Institute of Electrical and Electronics Engineers (IEEE) 802.11 standard. IEEE 802.11a and b use an unlicensed band in 2.4 GHz or 5 GHz. IEEE 802.11b provides a transmission rate of 11 Mbps, and IEEE 802.11a provides a transmission rate of 54 Mbps. IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. Further, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY

The disclosure proposes a method and a device for transmitting and receiving a signal by performing SU-MIMO beamforming available for a TDD SP structure in a wireless local area network (WLAN) system.

The disclosure proposes a method and a device for transmitting a signal by performing multiple-input multiple-output (MIMO) beamforming.

An embodiment proposes a method for transmitting a signal by performing MIMO beamforming even in a TDD SP in order to achieve a transmission rate required in 802.11ay.

First, terms are defined. A first STA may correspond to a responder that performs beamforming, and a second STA may correspond to an initiator that performs beamforming. MIMO beamforming described in this embodiment is performed between the first STA and the second STA and may thus correspond to single-user (SU)-MIMO beamforming. SU-MIMO beamforming includes four subphases (first to fourth subphases), which will be described in detail.

The first STA performs MIMO beamforming with the second STA during a time division duplex (TDD)-based service period (SP).

The first STA transmits a signal to the second STA based on the result of the MIMO beamforming.

The MIMO beamforming is described in detail below.

The SP includes a plurality of TDD slots. Specifically, the SP includes a plurality of TDD intervals, and one TDD interval includes a plurality of TDD slots. The plurality of TDD slots may include at least one Tx TDD slot for only transmitting a frame and at least one Rx TDD slot for only receiving a frame with respect to an initiator.

The MIMO beamforming includes a first subphase and a second subphase. In addition, the MIMO beamforming may further include a third subphase and a fourth subphase. The first subphase may be a SU-MIMO beamforming setup subphase. The second subphase may be a SU-MIMO beamforming feedback subphase. The third subphase may be an initiator-SU-MIMO beamforming training (I-SMBT) subphase. The fourth subphase may be a responder-SU-MIMO beamforming training (R-SMBT) subphase. The third subphase may follow the first subphase. The fourth subphase may follow the third subphase and may precede the second subphase.

An example of configuring a TDD slot in an inner-subphase is illustrated as follows.

In the first subphase, after receiving a first MIMO beamforming setup frame from the second STA, the first STA transmits a second MIMO beamforming setup frame in a (earliest) TDD slot allocated first among TDD slots allocated for the first STA. That is, in the first subphase, a TDD slot for transmitting and receiving a MIMO beamforming setup frame may be determined to efficiently perform MIMO beamforming in terms of time and power.

In the second subphase, after receiving a first MIMO beamforming feedback frame from the second STA, the first STA transmits a second MIMO beamforming feedback frame in a (earliest) TDD slot allocated first among TDD slots allocated for the first STA. That is, in the first subphase, a TDD slot for transmitting and receiving a MIMO beamforming feedback frame may be determined to efficiently perform MIMO beamforming in terms of time and power.

Further, an example of configuring a TDD slot in an inter-subphase is illustrated as follows.

After the second STA receives the second MIMO beamforming setup frame from the first STA, the second STA may transmit a first beam refinement protocol (BRP) frame in a (earliest) TDD slot allocated first among TDD slots allocated for the second STA in the third subphase. That is, after transmission/reception of the last frame in the first subphase is completed, the third subphase may start in the first allocated TDD slot.

After the first STA receives the first BRP frame from the second STA, the first STA may transmit a second BRP frame in a (earliest) TDD slot allocated first among TDD slots allocated for the first STA in the fourth subphase. That is, after transmission/reception of the last frame of the third subphase is completed, the fourth subphase may start in the first allocated TDD slot.

After the second STA receives the second BRP frame from the first STA, the second STA may transmit the first MIMO beamforming feedback frame in a (earliest) TDD slot allocated first among TDD slots allocated for the second STA in the second subphase. That is, after transmission/reception of the last frame in the fourth subphase is completed, the second subphase may start in the first allocated TDD slot.

Further, the third subphase may start after a lapse of a medium beamforming inter-frame space (MBIFS) from the end of the first subphase. The fourth subphase may start after a lapse of an MBIFS from the end of the third subphase. The second subphase may start after a lapse of an MBIFS from the end of the fourth subphase. After a subphase terminates, even though the start point of a first allocated (earliest) TDD slot is earlier than (comes before) an MBIFS, a subsequent subphase may start after a lapse of an MBIFS from when the subphase terminates.

When the first BRP frame includes a plurality of BRP frames, the plurality of BRP frames may be separately transmitted at an interval of a short inter-frame space (SIFS) within one TDD slot.

In addition, when the second BRP frame includes a plurality of BRP frames, the plurality of BRP frames may be separately transmitted at an interval of an SIFS within one TDD slot.

The plurality of TDD slots may be determined by a TDD slot structure element. The TDD slots allocated for the first STA and the TDD slots allocated for the second STA may be determined by a TDD slot schedule element. The TDD slot structure element and the TDD slot schedule element may be received from the second STA.

This embodiment may operate based on a non-reciprocal SU-MIMO beamforming procedure.

This embodiment may also operate based on a reciprocal SU-MIMO beamforming procedure.

According to the reciprocal SU-MIMO beamforming procedure, the first STA and the second STA supporting a TDD SP know each other's numbers of Tx/Rx sectors. In addition, the first STA and the second STA supporting the TDD SP may support reciprocity of an antenna pattern. Accordingly, the STAs may simplify the reciprocal SU-MIMO beamforming procedure using this reciprocity, compared to the non-reciprocal SU-MIMO beamforming procedure.

For example, the second STA may perform transmissions in the SU-MIMO beamforming setup subphase and the I-SMBT subphase within one Tx TDD slot. The first STA may transmit a MIMO beamforming feedback frame in an allocated Rx TDD slot following the Tx TDD slot. That is, beamforming may be completed using at least two TDD slots within one TDD period. Further, in the SU-MIMO beamforming setup subphase, only the second STA may transmit a MIMO beamforming setup frame, and the first STA may not transmit (may omit transmitting) a MIMO beamforming setup frame.

In the SU-MIMO beamforming feedback subphase, the first STA may transmit a MIMO beamforming feedback frame in an Rx TDD slot allocated first among Rx TDD slots allocated after receiving a MIMO beamforming setup frame and a BRP frame in the previous subphase.

The first STA and the second STA supporting the TDD SP may transmit information about a MIMO beamforming setup frame via a TDD route element. The TDD route element may include beamforming results with respect to a plurality of RF chains. In order to perform SU-MIMO beamforming, a beamforming result with respect to each RF chain is essentially needed, and thus the information about the MIMO beamforming setup frame may be included in the TDD route element, thereby simplifying the SU-MIMO beamforming procedure. Accordingly, it is possible to significantly reduce time for SU-MIMO beamforming in a TDD SP.

According to an embodiment proposed in this specification, it is possible to perform effective SU-MIMO beamforming in a TDD SP structure, receiving a minimal change in a channel. In order to perform MIMO beamforming, a STA uses a plurality of RF chains at the same time, thus causing an increase in power consumption. According to the proposed embodiment, using an earliest TDD slot may minimize an increase in power consumption.

BRIEF DESCRIPTION OF THE DRAWINGS

FIG. 9 is a diagram showing a PPDU structure that can be applied to the disclosure.

FIG. 17 is a diagram showing an extended schedule element that can be applied to the disclosure.

FIG. 18 is a diagram showing a TDD slot structure element that can be applied to the disclosure.

DESCRIPTION OF EXEMPLARY EMBODIMENTS

Hereinafter, the preferred embodiment of the disclosure will be described in detail with reference to the appended drawings. The detailed description that will hereinafter be disclosed along with the appended drawings will only be provided to describe an exemplary embodiment of the disclosure. Therefore, it should be understood that the exemplary embodiment presented herein will not represent the only embodiment for carrying out the disclosure.

The following detailed description includes specific details for providing a full understanding of the disclosure. However, it will be apparent to anyone skilled in the art that the disclosure can be carried out without referring to the above-mentioned specific details. In some cases, in order to avoid any ambiguity in the concept of the disclosure, the disclosed structure and device may be omitted, or the disclosed structure and device may be illustrated as a block diagram based on their core functions.

Although diverse mobile communication systems applying the disclosure may exist, a wireless LAN (WLAN) system will hereinafter be described in detail as an example of such mobile communication system.

1. Wireless LAN (WLAN) System 1-1. General Wireless LAN (WLAN) System

Figure 1:
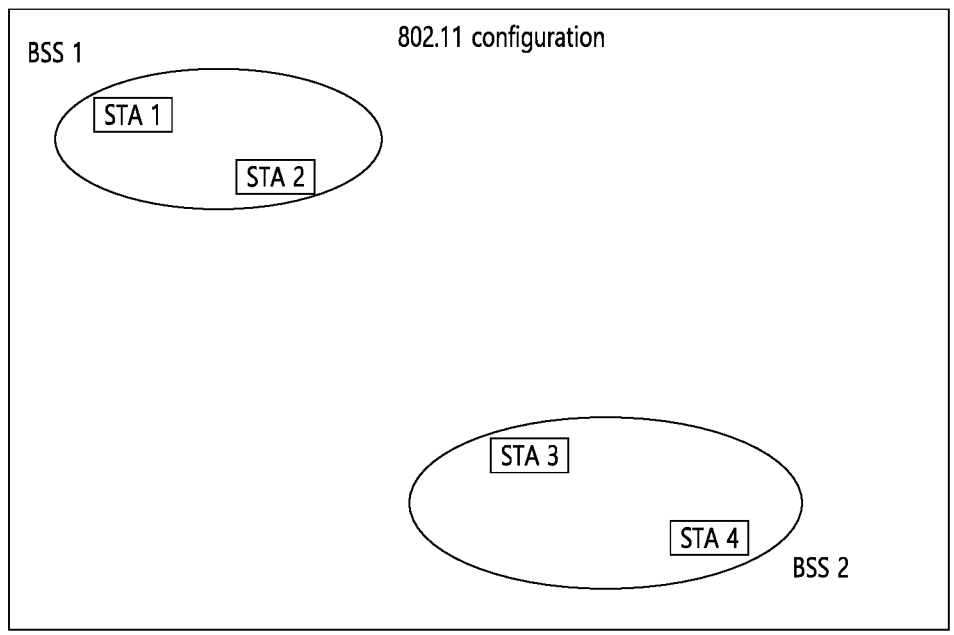
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP station. Among the STAs, a portable device (or terminal) that is operated by a user corresponds to a non-AP Station. Therefore, when an entity is simply mentioned to as an STA, the STA may also refer to a non-AP Station. Here, the non-AP Station may also be referred to as other terms, such as a terminal, a wireless transmit/receive unit (WTRU), a user equipment (UE), a mobile station (MS), a mobile terminal, a mobile subscriber unit, and the like.

Additionally, the AP is an entity providing its associated station (STA) with an access to a distribution system (DS) through a wireless medium. Here, the AP may also be referred to as a centralized controller, a base station (B), a Node-B, a base transceiver system (BTS), a personal basic service set central point/access point (PCP/AP), a site controller, and the like.

A BSS may be categorized as an infrastructure BSS and an independent BSS (IBSS).

The BSS shown in FIG. 1 corresponds to an IBSS. The IBSS refers to a BSS that does not include an AP. Since the BSS does not include an AP, access to the DS is not authorized (or approved), and therefore, the IBSS functions as a self-contained network.

Figure 2:
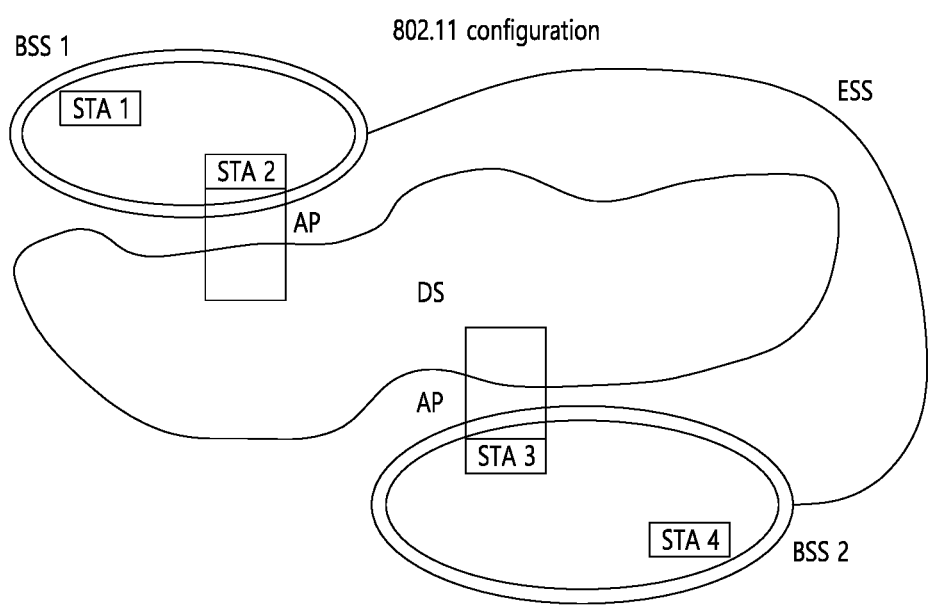
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
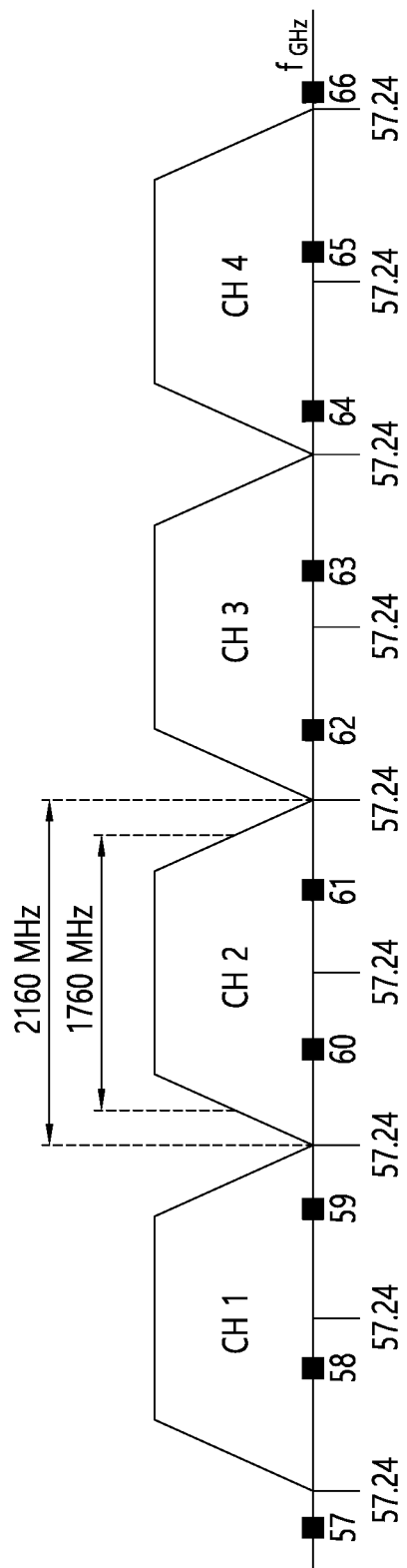
FIG. 3 is a diagram showing a channel in a 60 GHz band for describing a channel bonding operation according to an exemplary embodiment of the disclosure.

FIG. 3 is a diagram showing a channel in a 60 GHz band for describing a channel bonding operation according to an exemplary embodiment of the disclosure.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. Accordingly, Channel 2 and Channel 3 may be used for channel bonding. However, it shall be understood that diverse channels may be used for channel bonding. Therefore, the disclosure will not be limited to only one or more specific channels.

Figure 4:
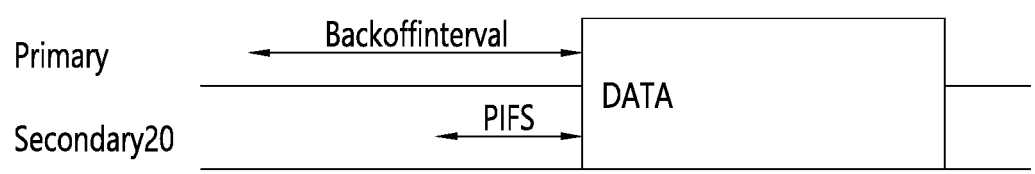
FIG. 4 is a diagram showing a basic method for performing channel bonding in a wireless LAN (WLAN) system.

FIG. 4 is a diagram showing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). Therefore, there lies a difficulty in that measures cannot be flexibly taken in accordance with the circumstances (or situation) of the medium.

Accordingly, in an aspect of the disclosure, a solution (or method) for performing scheduling-based access by having the AP transmit scheduling information to the STAs is proposed. Meanwhile, in another aspect of the disclosure, a solution (or method) for performing contention-based channel access based on the above-described scheduling or independently from the above-described scheduling is proposed. Furthermore, in yet another aspect of the disclosure, a method for performing communication through a spatial sharing technique based on beamforming is proposed.

1-3. Beacon Interval Configuration

Figure 5:
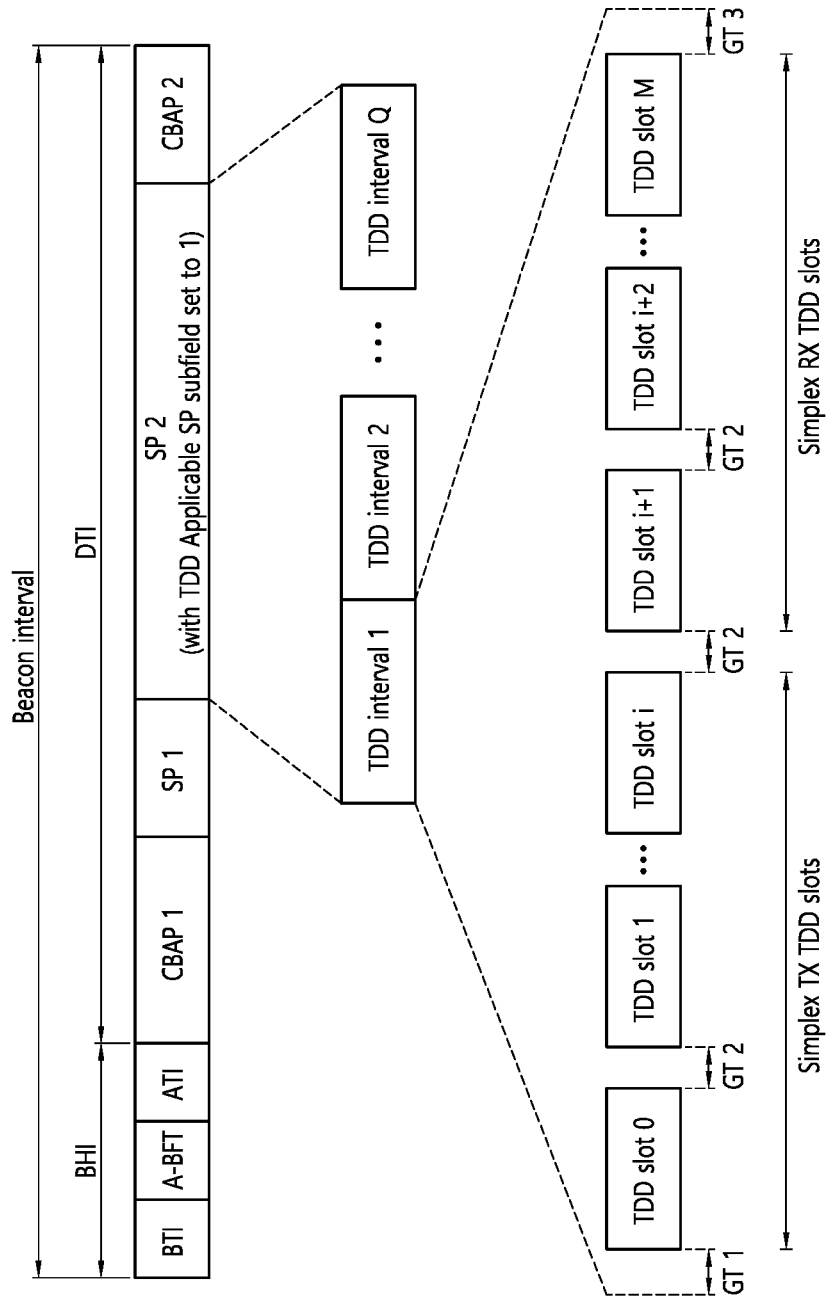
FIG. 5 is a diagram showing a configuration of a beacon interval.

FIG. 5 is a diagram showing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one beacon header interval (BHI) and one data transfer interval (DTI). As shown in FIG. 4, the BHI may include a beacon transmission interval (BTI), an association beamforming training (A-BFT), and an announcement transmission interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the data transfer interval (DTI) refers to a period during which a frame exchange is performed between the STAs. As shown FIG. 5, one or more contention based access periods (CBAPs) and one or more Service Periods (SPs) may be allocated (or assigned) to the DTI. Although FIG. 5 shows an example where 2 CBAPs and 2 SPs are allocated to the DCI, this is merely exemplary. Therefore, the disclosure is not necessarily required to be limited only to this.

FIG. 5 shows a structure of a TDD service period (SP). The TDD SP consists of one or more consecutive and adjacent TDD intervals (TDD interval 1, TDD interval 2, . . . , TDD interval Q) actualized by a TDD slot structure element. The TDD interval includes one or more TDD slots. Adjacent TDD slots shown in FIG. 5 shall be separated temporally by a guard time (GT) defined by the TDD slot structure element (according to FIG. 5, the slots are separated temporally by GT1, GT2, GT3). If all STA operations are identical, transmission and reception of the adjacent TDD slots allocated to the same STA pair may be continued between the adjacent TDD slots.

An STA which intends to transmit data through a beamforming operation is referred to as an initiator, and an STA which receives data transmitted from the initiator is referred to as a responder. According to FIG. 5, the initiator may transmit data (or a frame) to the responder in a TX TDD slot (TDD slot 0, TDD slot 1, TDD slot i), and the responder may receive data (or a frame) from the initiator in an RX TDD slot (TDD slot i+1, TDD slot i+2, TDD slot M).

Hereinafter, a physical layer configuration in a wireless LAN (WLAN) system, in which the disclosure is to be applied, will be described in detail.

1-4. Physical Layer Configuration

It will be assumed that the wireless LAN (WLAN) system according to an exemplary embodiment of the disclosure may provide 3 different modulations mode as shown below.

TABLE 1

| PHY | MCS | Note |
| --- | --- | --- |
| Control PHY | 0 | |
| Single carrier PHY (SC PHY) | 1 . . . 12 25 . . . 31 | (low power SC PHY) |
| OFDM PHY | 13 . . . 24 | |

Figure 6:
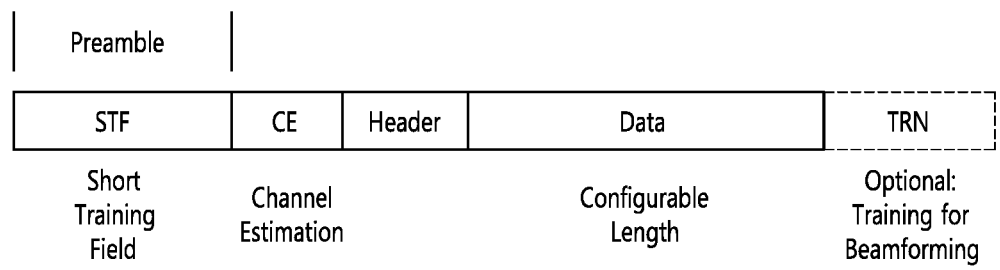
FIG. 6 is a diagram showing a physical configuration of a legacy radio frame.

Such modulation modes may be used for satisfying different requirements (e.g., high throughput or stability). Depending upon the system, among the modulation modes presented above, only some of the modulation modes may be supported. FIG. 6 is a diagram showing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
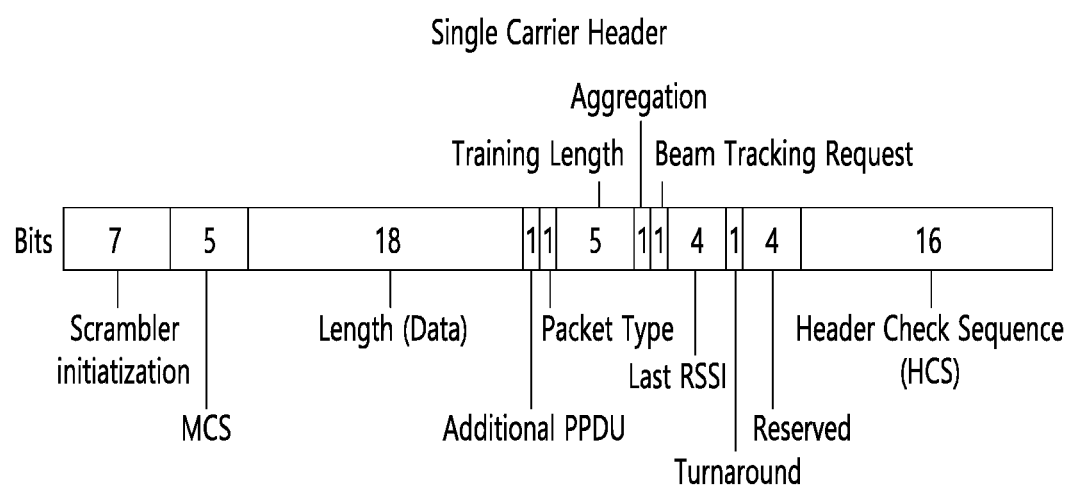
FIG. 7 and FIG. 8 are diagrams showing a configuration of a header field of the radio frame shown in FIG. 6.
Figure 8:
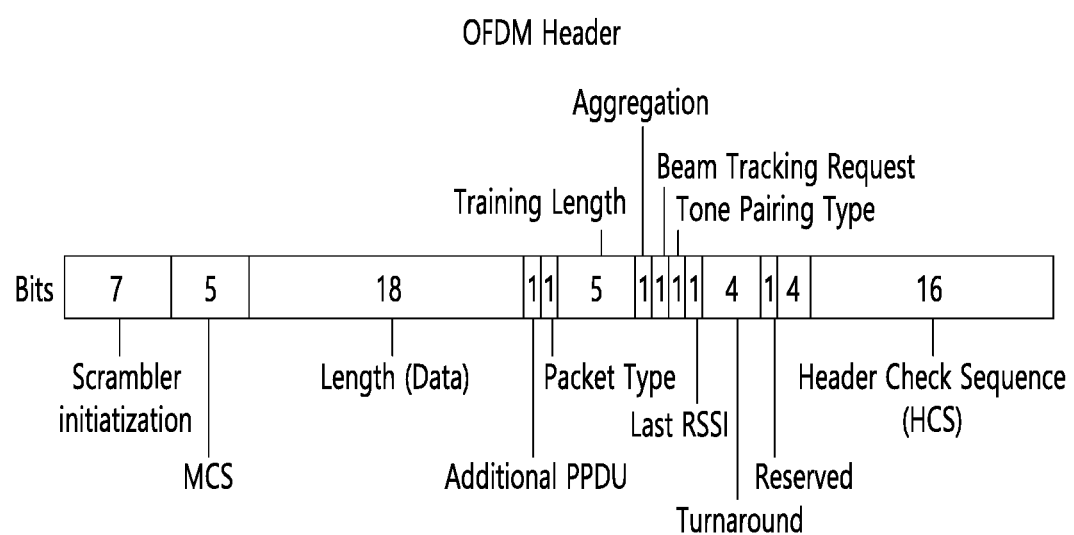

FIG. 7 and FIG. 8 are diagrams describing a configuration of a header field of the radio frame shown in FIG. 6.

More specifically, FIG. 7 illustrates a case where a single carrier (SC) mode is used. In the SC mode, the header may include information indicating an initial value of scrambling, information indicating a modulation and coding scheme (MCS) and a data length, information indicating the presence or absence of an additional physical protocol data unit (PPDU), and information on a packet type, a training length, aggregation or non-aggregation, a presence or absence of a beam training request, a last Received Signal Strength Indicator (RSSI), truncation or non-truncation, a header check sequence (HCS), and the like. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. The header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a header check sequence (HCS), and the like. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. Here, channel bonding and MIMO may be supported by using the newly defined field.

FIG. 9 is a diagram showing a PPDU structure according to a preferred embodiment of the disclosure. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a mixed mode, a legacy preamble (legacy STF, legacy CE) is duplicated through each channel. According to the exemplary embodiment of the disclosure, it may be considered to perform the transmission (gap filling) of a new STF and CE field along with the legacy preamble at the same time through the 400 MHz band between each channel.

In this case, as shown in FIG. 9, the PPDU structure according to the disclosure has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
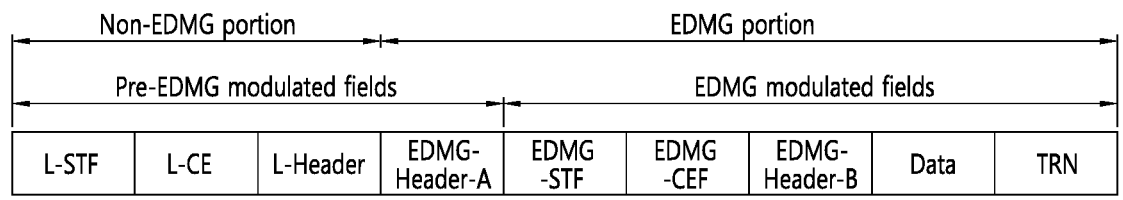
FIG. 10 is a diagram showing a simple PPDU structure that can be applied to the disclosure.

FIG. 10 is a diagram showing a simple PPDU structure that can be applied to the disclosure. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and the like).

Here, the part (or portion) including the L-STF, L-CEF, and L-header fields may be referred to as a non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

3. Beamforming Procedure that is Applicable to the Disclosure

As described above, methods such as channel bonding, channel aggregation, FDMA, and the like, which transmit data by using a plurality of channels at the same time may be applied in the 11ay system that can apply the disclosure. Most particularly, since the 11ay system that can apply the disclosure uses signals of a high frequency band, beamforming operation may be applied in order to transmit and/or receive signals at a high reliability level.

However, in the related art 11ad system, a beamforming method for one channel is only disclosed, and there is no implication on any beamforming method that can be applied for a plurality of channels. Accordingly, the disclosure proposes a beamforming procedure that is applicable to a data transmission method being performing through a plurality of channels (e.g., channel bonding, channel aggregation, FDMA, and the like) according to the 11ay system.

More specifically, hereinafter a method of performing beamforming for only one channel (Section 3.1.) and a method of performing beamforming for a plurality of continuous or non-continuous channels (Section 3.2.), which are performed by the STA before the data transmission process in order to perform the data transmission through beamforming, will each be described in detail.

3.1. Performing Beamforming for Only One Channel

Figure 11:
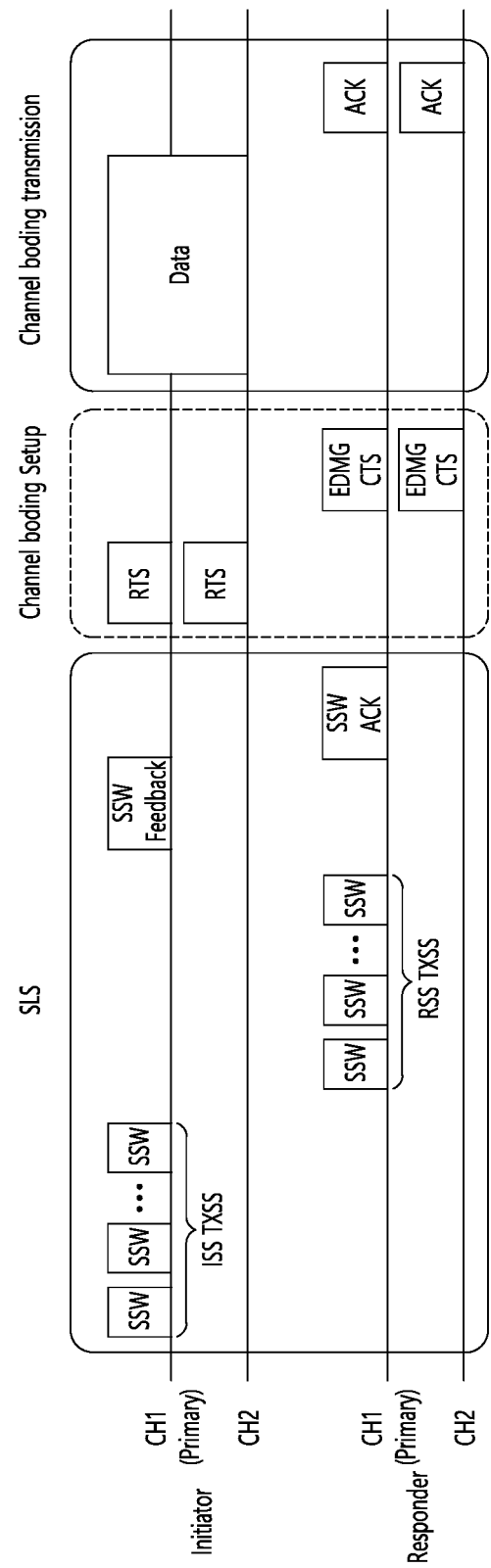
FIG. 11 is a diagram showing an operation for performing beamforming on one channel according to an exemplary embodiment of the disclosure.

FIG. 11 is a diagram showing an operation for performing beamforming on one channel according to an exemplary embodiment of the disclosure. Referring to FIG. 11, an STA that intends to transmit data through the beamforming operation is referred to as an initiator, and an STA that receives the data from the initiator is referred to as a responder. Although only a total of 2 channels (e.g., CH1, CH2) are shown in FIG. 11, the configuration of the disclosure may also be extendedly applied to channel bonding, channel aggregation, and the like, through 3 or more channels.

As shown in FIG. 11, the beamforming procedure according to an exemplary embodiment of the disclosure may be configured of a sector level sweep (SLS) phase, a channel bonding setup phase, and a channel bonding transmission phase. Hereinafter, the characteristics of each phase will be described in detail.

3.1.1. SLS Phase

In a 60 GHz band supporting the 11ay system, which can apply the disclosure, in order to deliver data, control information, and the like, at a high reliability level, a directional transmission method, and not an omni transmission method, may be applied.

As a process for performing such application, the STAs that intend to transmit and/or receive data may be capable of knowing a Tx or Rx best sector for the initiator and the responder through the SLS process.

For a more detailed description of the above, configurations that are applicable to the SLS phase will hereinafter be described in detail with reference to the accompanying drawing(s).

Figure 12:
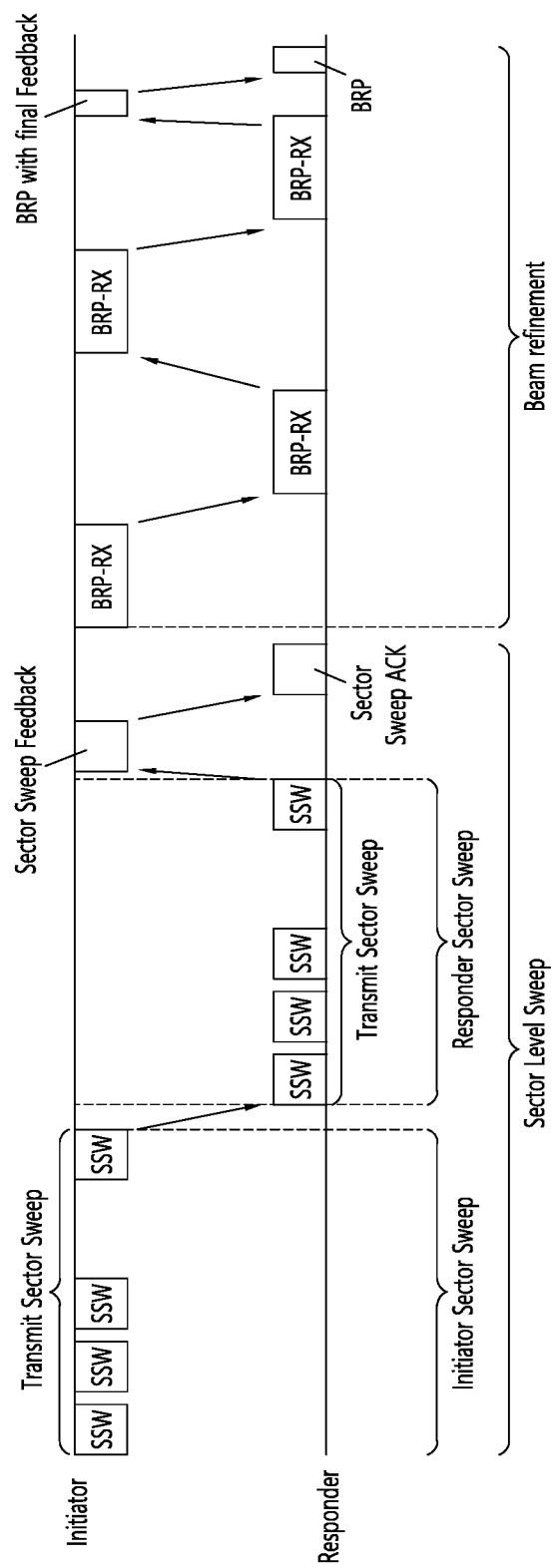
FIG. 12 shows an example of a beamforming training procedure that can be applied to the disclosure.

FIG. 12 shows an example of a beamforming training procedure that can be applied to the disclosure.

In a BF training that is generated during an association beamforming training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a transmission opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the sector level sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a beam refinement protocol or beam refinement phase (BRP) may follow the SLS phase.

An object of the BRP phase is to enable iterative refinement of an antenna weight vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an initiator sector sweep (ISS) for training an initiator link, a responder sector sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the transmit sector sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
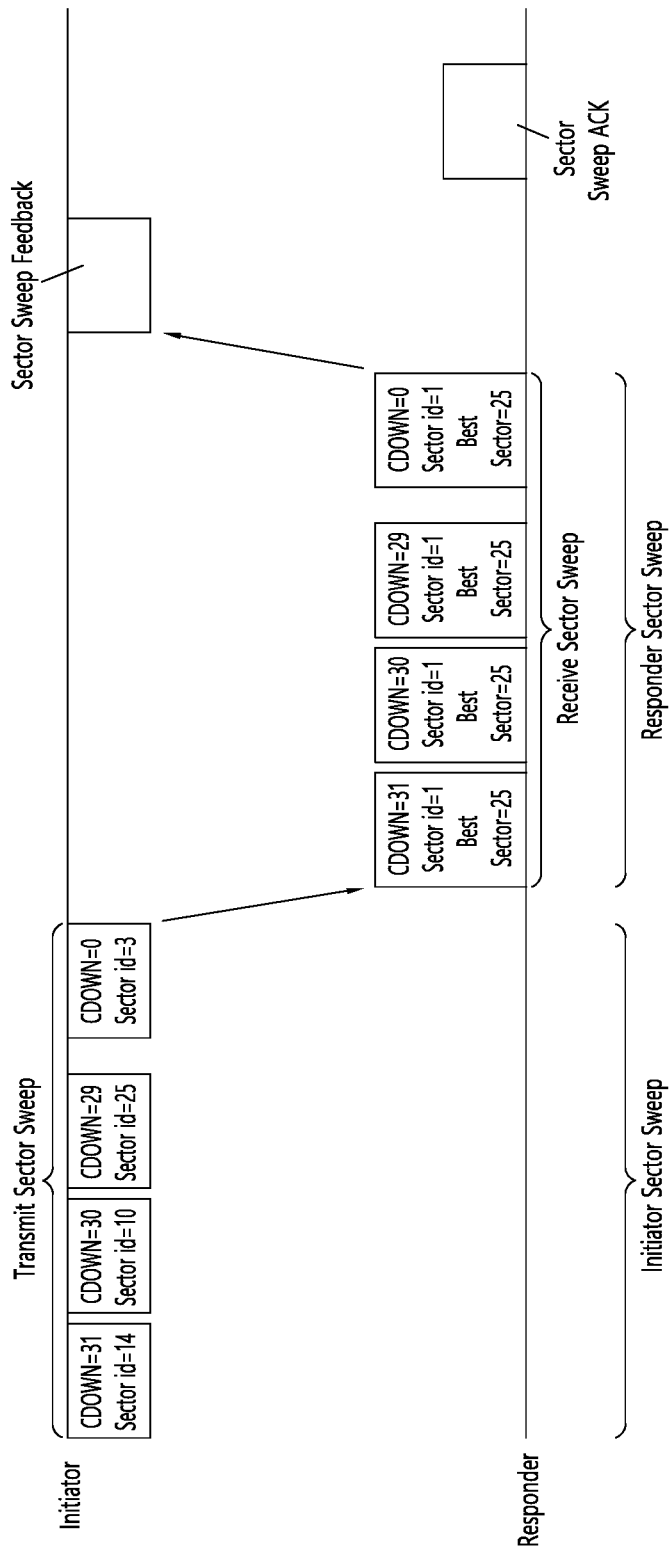
FIG. 13 and FIG. 14 are diagrams showing examples of a sector level sweep (SLS) phase.
Figure 14:
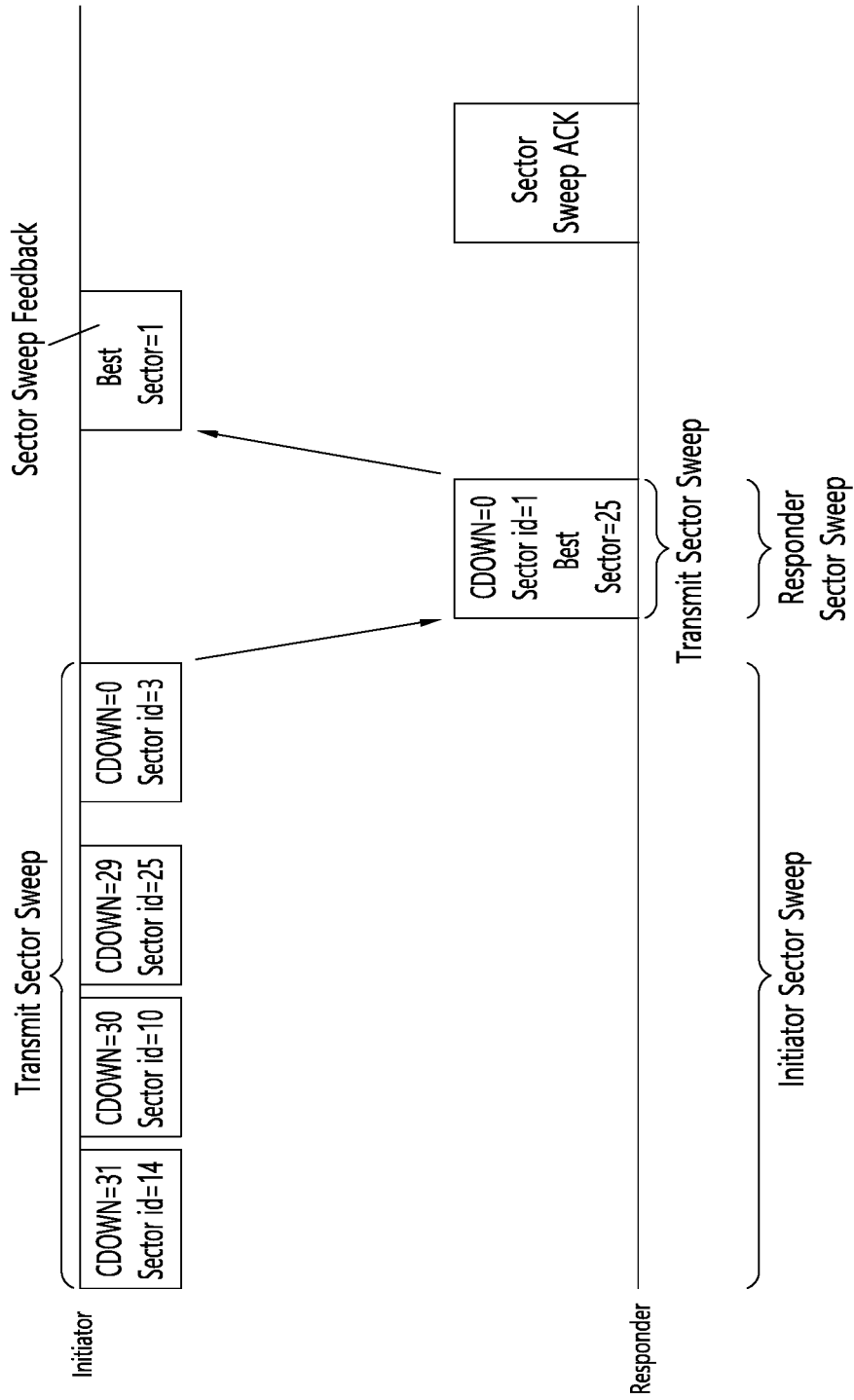

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training for the initiator may be performed during the BRP phase.

Such SLS may be described as presented below.

As a protocol performing link detection in an 802.11ay system that can apply the disclosure, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and the like) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using a BRP frame, which is defined for the BRP protocol and which includes beam training information and information reporting the training results. For example, the BRP corresponds to a beam training method, wherein a BRP frame is transmitted and/or received by using a beam that is determined by a previous beam training, and wherein a beam training is actually performed by using a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a beacon header interval (BHI) and/or a data transfer interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. Here, if the initiator and the responder correspond to the 11ay STA, the initiator and the responder may transmit a short SSW frame instead of the SSW frame for the SLS phase.

Here, the short SSW frame may be defined as a frame including a short SSW packet within a data field of a DMG control PHY or DMG control mode PPDU. Here, a detailed format of the short SSW packet may be differently configured in accordance with the purpose (e.g., I-TXSS, R-TXSS, and the like) for which the short SSW packet is being transmitted.

The characteristics of the above-described SLS phase may also be applied to all of the SLS phases that will hereinafter be described.

3.1.2. Channel Bonding Setup Phase

Referring to FIG. 11, the STAs (e.g., initiator, responder, and the like) that intend to perform data communication in the above-described phase may transmit and/or receiving control information for channel bonding, channel aggregation, FDMA transmission, and the like, while sending and receiving an RTS (setup frame) and a DMG CTS (feedback frame) to and from one another. Here, information for the transmission method using a plurality of channels, such as channel bonding, channel aggregation, FDMA transmission, and the like, wherein the information includes channel information, channel bandwidth, and the like, may be applied as the information being transmitted and received to and from one another.

In this exemplary embodiment, beamforming training for one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through a plurality of channels, the RTS and DMG CTS may be transmitted by applying the best sector direction, which is decided earlier through the SLS phase, as described above, to all of the channels.

3.1.3. Channel Bonding Transmission Phase

As shown in FIG. 11, after receiving the DMG CTS, which corresponds to the response to the transmitted RTS, the initiator may transmit actual data through a plurality of idle channels by using information formation on the channel that is negotiated with the responder, and other information, such as channel bandwidth, and the like.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using the above-described method, the initiator and the responder may acquire information on the channel that can actually be used for the data transmitted, and the initiator may transmit data through channels that can actually be used.

Here, since the initiator and the responder have already performed the beamforming training for only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using channel bonding, the initiator may also transmit data by using the channel aggregation method.

In response to this, the responder may transmit an ACK frame through the same channel that was used by the initiator for transmitting the data. Here, the ACK frame may be duplicated and transmitted through each channel, which was used for transmitting the data, or the ACK frame may be transmitted after performing channel bonding.

3.2. Performing Beamforming for Plurality of Channels

Hereinafter, a beamforming procedure in which the foregoing beamforming operation is performed on a plurality of channels (preferably, channels for an initiator and a responder to transmit and/or receive data) will be described in detail.

The foregoing beamforming training operation for one channel may not be optimized to channel bonding using a plurality of channels for the following reasons.

The characteristics of one channel may not be the same as the characteristics of other channels.

The beamforming training result for one channel may be different from the beamforming training result for the entire bandwidth.

Accordingly, in this section, as a solution (or method) for maximizing the capability gain in accordance with the channel bonding process, a detailed solution (or method) for performing beamforming training for the entire bandwidth, which is used for channel bonding, will be described in detail.

Figure 15:
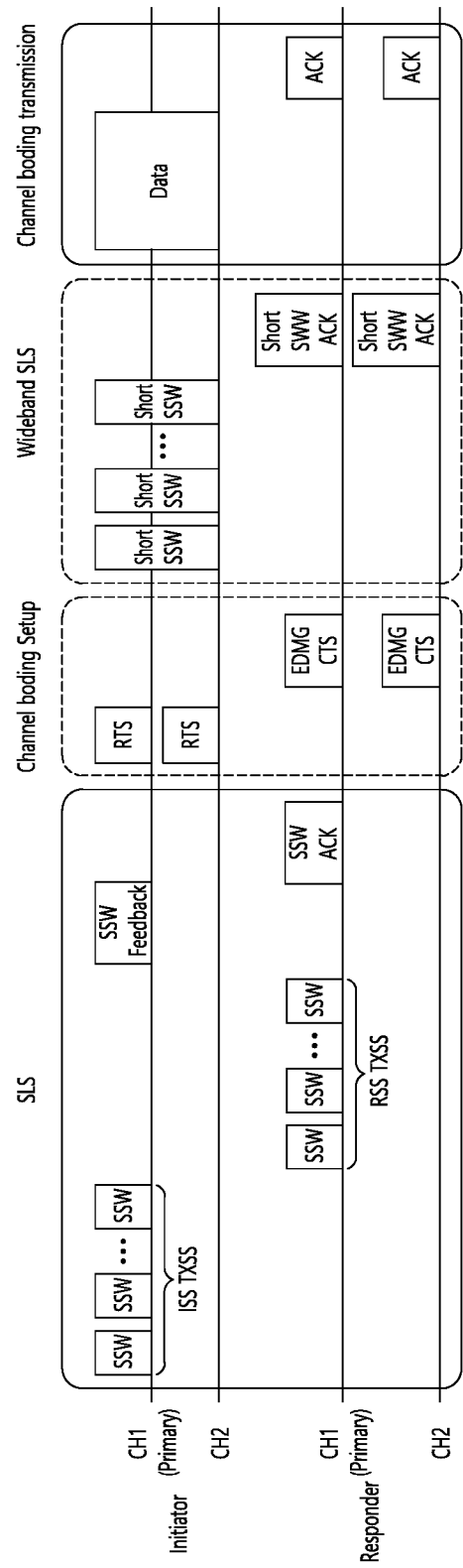
FIG. 15 is a diagram showing an operation of performing beamforming on a plurality of channels according to an embodiment of the disclosure.

FIG. 15 is a diagram showing operations for performing beamforming on a plurality of channels according to another embodiment of the disclosure. Similarly to FIG. 11, in FIG. 15, an STA to transmit data through a beamforming operation is referred to as an initiator, and an STA to receive the data from the initiator is referred to as a responder. Although only a total of 2 channels (e.g., CH1, CH2) are shown in FIG. 15, the configuration of the disclosure may also be extendedly applied to channel bonding, channel aggregation, and so on, through three or more channels.

As shown in FIG. 15, the operation of performing beamforming for a plurality of channels according to another embodiment of the disclosure may include a SLS phase, a channel bonding setup phase, a wideband SLS phase, and a channel bonding transmission phase. Here, the wideband SLS phase will not be limited to the related art SLS configuration but may include all beamforming training methods that can be extended to wideband beamforming training. For example, the wideband SLS phase may be replaced with a wideband BRP phase, which extendedly applies the related art BRP phase, or may include the wideband BRP phase.

Figure 16:
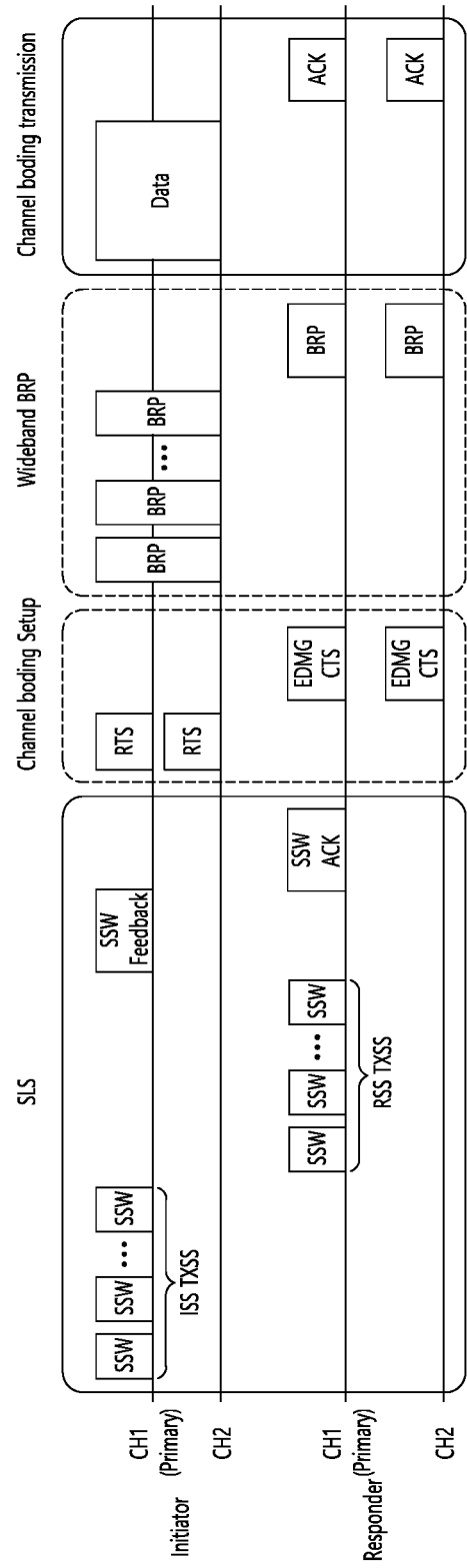
FIG. 16 is a diagram showing operations for performing beamforming on a plurality of channels according to another embodiment of the disclosure.

FIG. 16 is a diagram showing operations for performing beamforming on a plurality of channels according to yet another embodiment of the disclosure.

As described above, the wideband SLS phase of FIG. 15 may also be replaced with the wideband BRP phase of FIG. 16. Alternatively, according to another embodiment, the wideband SLS phase of FIG. 15 may also be configured as a wideband beamforming training phase further including a wideband BRP phase.

3.2.1. SLS Phase

As in the above operations described in Section 3.1.1, the initiator and the responder may perform the SLS phase. Through this phase, the initiator and the responder may perform beamforming training for one channel (e.g., primary channel).

Since the SLS phase has already been described above in detail, a detailed description of the same will be omitted for simplicity.

3.2.2. Channel Bonding Setup Phase

As described above in Section 3.1.2, the initiator and the responder may transmit and/or receive an RTS (setup frame) and a DMG CTS (feedback frame) through the channel bonding setup phase, and then the initiator and the responder may transmit and/or receive information for channel bonding, channel aggregation, FDMA transmission, and the like.

Moreover, in addition to the information mentioned above, the initiator and the responder may simultaneously transmit and/or receive information on the method for performing beamforming training on a plurality of channels to and from one another.

The initiator may notify the responder of the performance or non-performance of the beamforming training for a plurality of channel through a setup frame or RTS frame. For this, the initiator may transmit the setup frame or RTS frame including the information indicating the performance or non-performance of beamforming training for the a plurality of channels to the responder.

The responder may notify to the responder whether or not the beamforming training for a plurality of channels can be performed through a feedback frame or DMG CTS frame. For this, the responder may transmit the feedback frame or DMG CTS frame, which includes the information indicating whether or not the beamforming training for a plurality of channels can be performed, to the initiator.

Additionally, the responder may notify to the initiator which one of initiator TX sector sweep (I-TXSS), initiator RX sector sweep (I-RXSS), responder TX sector sweep (R-TXSS), and responder RX sector sweep (R-RXSS) is to be performed in the subsequent wideband SLS phase through the feedback frame or DMG CTS frame. Moreover, the responder may notify whether or not to perform beam training on the TX and the RX at the same time through the feedback frame or DMG CTS frame.

Alternatively, the responder may notify whether TX beamforming training is to be performed or whether RX beamforming training is to be performed is to be performed in the wideband BRP phase through the feedback frame or DMG CTS frame. Alternatively, the responder may notify whether or not to perform beam training on the TX and the RX at the same time through the feedback frame or DMG CTS frame.

As shown in the above-described configurations, the beamforming training related information that is transmitted and received by the initiator and the responder to and from one another in the channel bonding setup phase may be included in any one of the setup frame and the feedback frame.

Additionally, in case the initiator intends to transmit data to the responder by using the FDMA method, the initiator may perform the FDMA transmission setup through the channel bonding set up phase.

More specifically, the initiator may signal a resource unit (RU) allocation, a channel feedback request, a report method, and the like through a setup frame (or RTS frame).

Additionally, the responder may notify a signal-to-noise ratio (SNR) or signal-to-interference & noise ratio (SINR) through a feedback frame by using feedback values corresponding to the available channels.

As described above, the initiator and the responder may transmit and/or receive the RTS frame and the DMG CTS frame to and from one another through the channel bonding setup phase. Here, since the initiator and the responder has performed the beamforming training for one channel (e.g., primary channel) through the above-described SLS phase, the initiator and the responder may also transmit and/or receive the RTS frame and the DMG CTS frame by applying the same best sector direction for the one channel to other channels as well. Here, the RTS frame and the DMG CTS frame that are transmitted through each of the channels may be duplicated and transmitted for each channel.

4. Proposed Embodiment

To achieve a transmission rate required in 802.11 ay, a transmission technique using MIMO needs to be supported even in a TDD SP.

Generally, a beamforming process for MIMO during a SP or CBAP is performed through bidirectional continuous transmission and reception at an interval of a medium beamforming inter-frame space (MBIFS). However, in a TDD SP, since a UL interval and a DL interval are strictly divided, a general beamforming process for MIMO cannot be used. This is because a very long time is required to complete beamforming, which results in an inefficient beamforming process, making it difficult to satisfy system-required performance.

The disclosure proposes a beamforming process for MIMO transmission during a TDD SP, which is a fast and efficient method based on the characteristics of TDD SP.

4.1. Configuration of TDD SP

FIG. 17 is a diagram showing an extended schedule element that can be applied to the disclosure. The EDMG extended schedule element in FIG. 17 defines channel scheduling for an EDMG BSS and includes an indicator for channels scheduled to be allocated.

Figure 19:
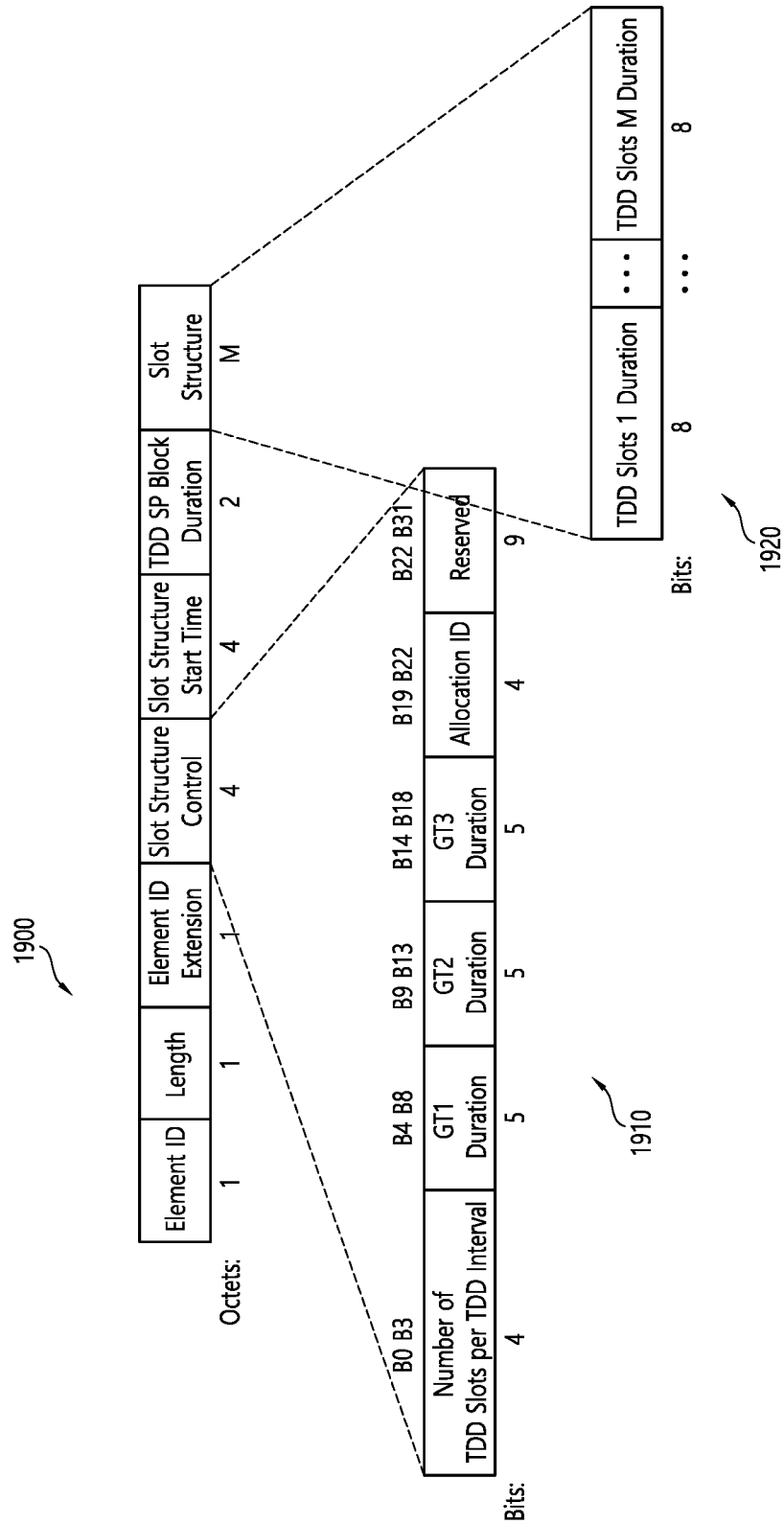
FIG. 19 is a diagram showing a slot structure control field and a slot structure field included in a TDD slot structure element.

FIG. 18 is a diagram showing a TDD slot structure element that can be applied to the disclosure. FIG. 19 is a diagram showing a Slot Structure Control field and a Slot Structure field included in the TDD slot structure element.

Referring to the Slot Structure Control field 1910 in FIG. 19, the value of a Number of TDD Slots per TDD Interval subfield (4 bits) plus 1 indicates the number of TDD slots in each TDD interval. GT1 Duration, GT2 Duration, and GT3 Duration subfields indicate the duration of GT1, GT2, and GT3 shown in FIG. 5 in microseconds. An Allocation ID field is set to the same value as that of an Allocation ID field of an Allocation Control field of the extended schedule element indicating TDD allocation in FIG. 17.

A Slot Structure Start Time subfield in FIG. 18 indicates lower four octets of a TSF timer at the start of a first TDD SP where a slot structure takes effect. A TDD SP Block Duration subfield in FIG. 18 indicates the duration of a TDD SP in microseconds.

The number M of octets in the Slot Structure field 1920 in FIG. 19 is equal to the value of the Number of TDD Slots per TDD Interval) in FIG. 19. A TDD Slot i Duration field ($1 \le i \le M$) indicates the duration of an ith TDD slot in each TDD interval in microseconds.

Figure 20:
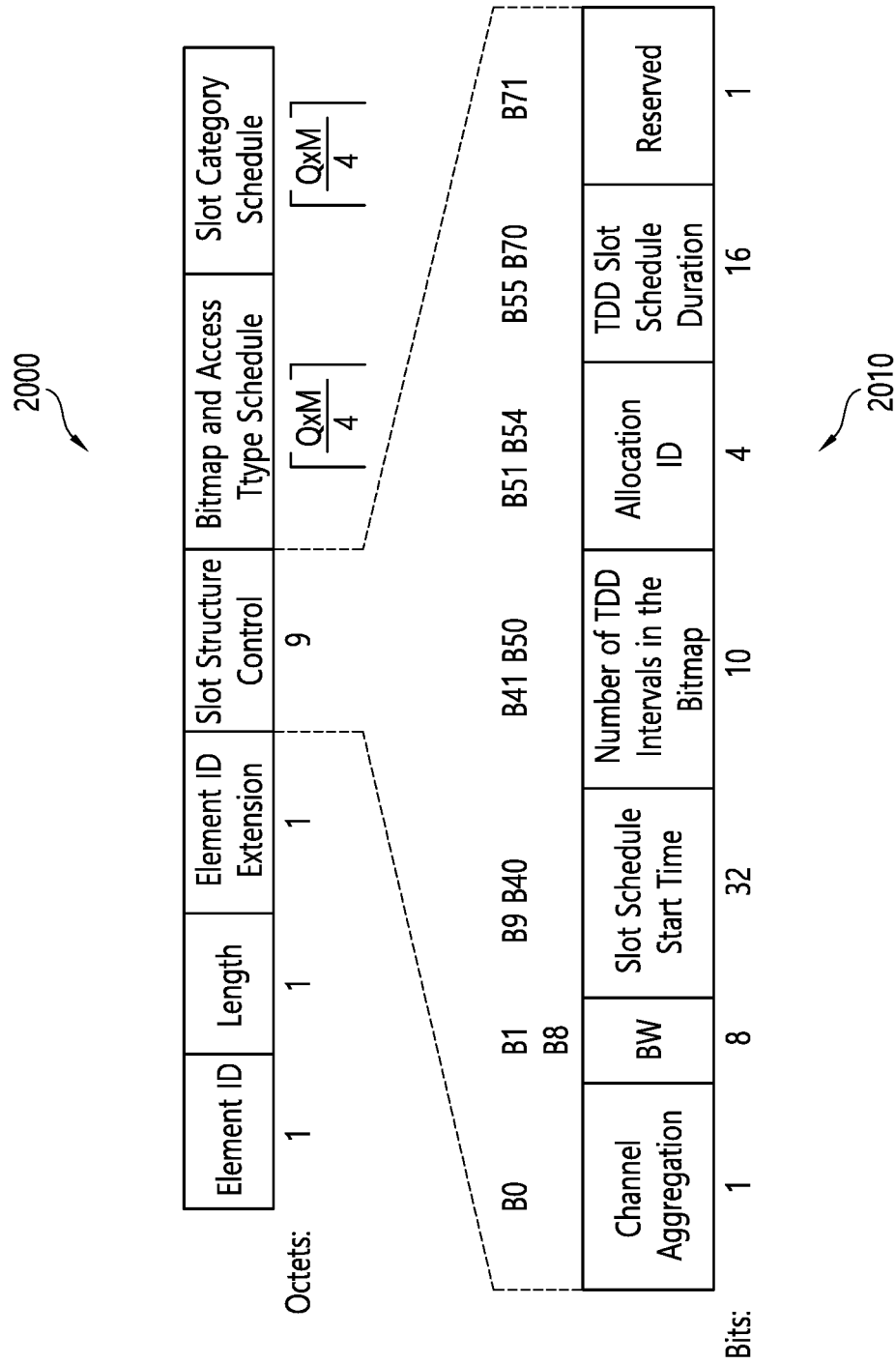
FIG. 20 is a diagram showing a TDD slot schedule element and a slot schedule control field included in the TDD slot schedule element.

FIG. 20 is a diagram showing a TDD slot schedule element and a Slot Schedule Control field included in the TDD slot schedule element.

The TDD slot schedule element 2000 in FIG. 20 defines access allocation for a DMG STA with respect to a TDD slot in a TDD SP.

The TDD Slot Schedule Control field 2010 in FIG. 20 is as follows.

A Slot Schedule Start Time subfield indicates lower four octets of a TSF timer at the start of a first TDD SP where a schedule takes effect.

A Number of TDD Intervals in the Bitmap subfield indicates the number of TDD intervals specified by a Bitmap and Access Type Schedule subfield after a time specified by the Slot Schedule Start Time subfield.

An Allocation ID field is set to the same value as that of the Allocation ID field of the Allocation Control field of the extended schedule element indicating TDD allocation in FIG. 17.

A TDD Slot Schedule Duration subfield indicates, in microseconds, duration from the start of a first TDD interval, in which a schedule takes effect, to the end of a last TDD interval.

The Bitmap and Access Type Schedule subfield define the type of a TDD slot and whether to allow a DMG STA to access a TDD slot covered by the bitmap.

A PCP/AP (DN) indicates the structure of a TDD SP to a STA (CN/DN) using the extended schedule element and the TDD slot structure element. The PCP/AP indicates a TDD slot in a TDD interval allocated for STAs to the STAs using the TDD slot schedule element. Therefore, a STA allocated a particular TDD slot may perform only one operation of transmission and reception during the TDD slot.

A beamforming (BF) method to which SU-MIMO can be applied is proposed in order to achieve a transmission rate required in 802.11ay in a TDD SP structure.

4.2. Method Using Existing SU-MIMO Beamforming Procedure

Figure 21:
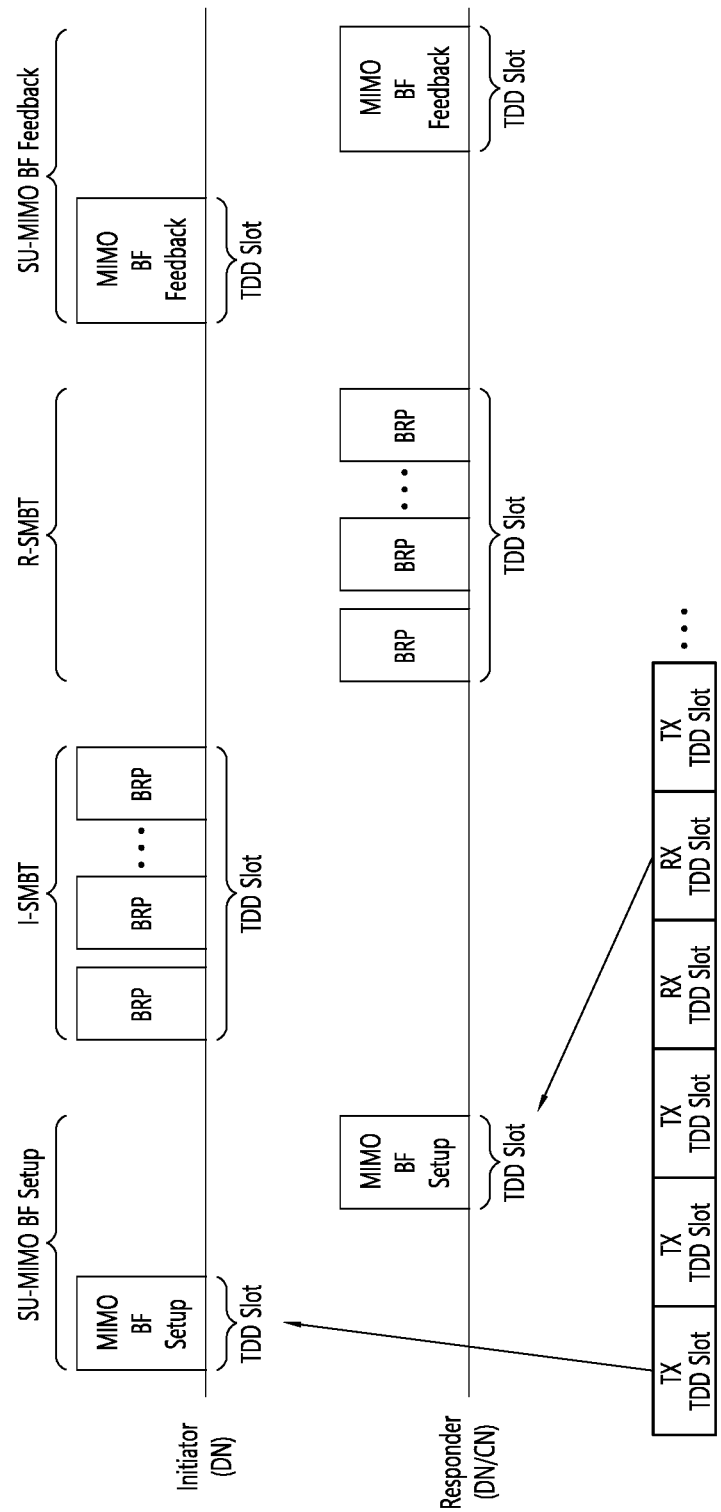
FIG. 21 illustrates an example of a SU-MIMO beamforming process that can be applied to the disclosure.

FIG. 21 illustrates an example of a SU-MIMO beamforming process that can be applied to the disclosure.

Referring to FIG. 21, a SU-MIMO beamforming process where channel access corresponds to a CBAP and an SP in the DTI in FIG. 5 may be applied to a TDD SP.

A PCP/AP (DN) notifies a particular STA (CN) of a TDD SP structure and allocates the STA to particular slots for SU-MIMO beamforming. During a TX TDD slot in which an initiator performs transmission, a responder operates in a reception mode. During an RX TDD slot in which the responder performs transmission, the initiator operates in the reception mode.

When SU-MIMO beamforming is performed by a method illustrated in FIG. 21, a plurality of TDD slots is required, and thus a plurality of TDD intervals is required. Accordingly, it takes a long time to complete beamforming.

Here, even though an existing procedure is reused, transmission is inevitably performed based on a TDD slot schedule. Thus, a SU-MIMO beamforming procedure needs to be performed based on a TDD slot schedule set by the DN instead of a rule for transmission after MIFS which is used between existing sub-procedures.

4.3. Method Using New SU-MIMO Beamforming Procedure

Figure 22:
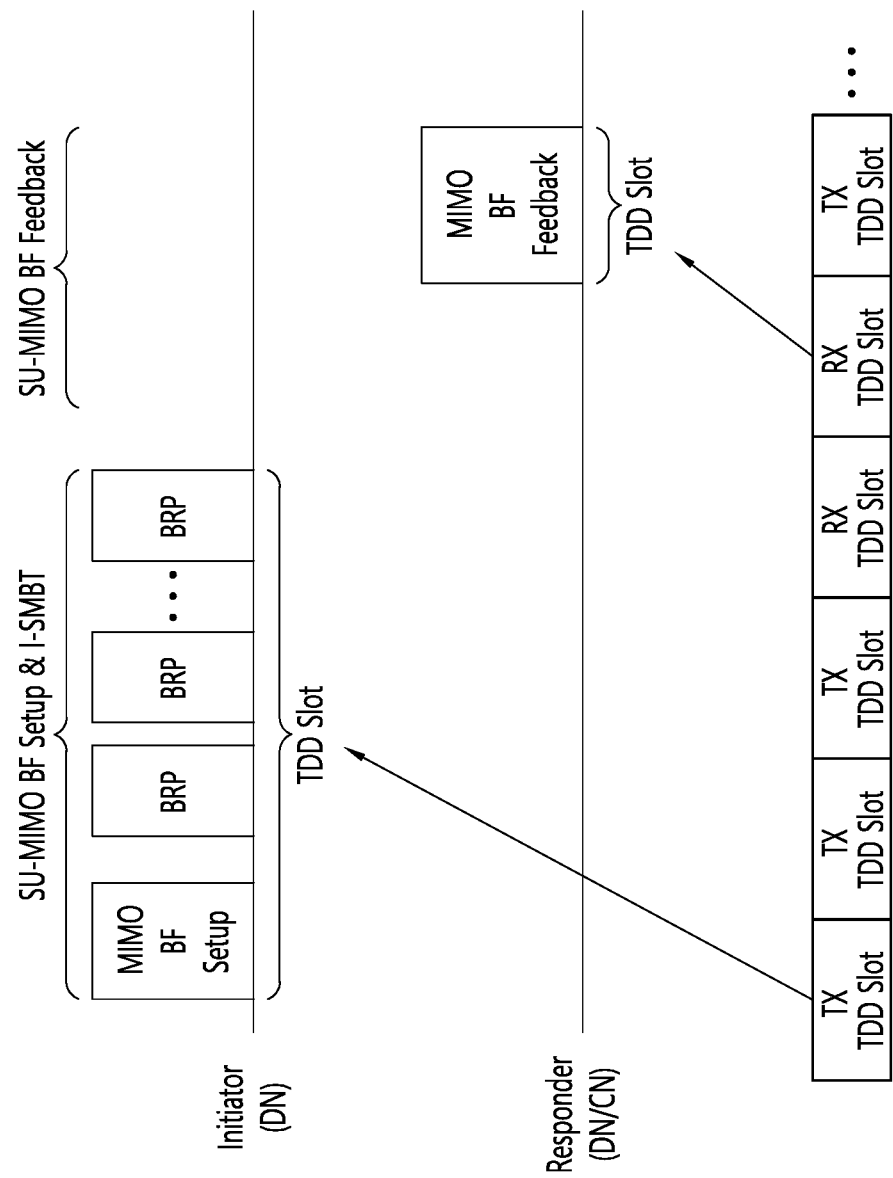
FIG. 22 illustrates another example of a SU-MIMO beamforming process that can be applied to the disclosure.

FIG. 22 illustrates another example of a SU-MIMO beamforming process that can be applied to the disclosure.

A PCP/AP and STAs supporting a TDD SP know each other's numbers of Tx/Rx sectors. In addition, the PCP/AP and the STAs supporting the TDD SP may support reciprocity of an antenna pattern.

Accordingly, the STAs supporting the TDD SP may efficiently simplify a SU-MIMO beamforming process using this capability as follows.

Referring to FIG. 22, using a SU-MIMO beamforming process enables both a SU-MIMO beamforming setup subphase and an I-SMBT subphase to be performed within one Tx TDD slot. Further, a MIMO beamforming feedback subphase is possible in the following allocated Rx TDD slot.

Therefore, beamforming may be completed using at least two TDD slots within one TDD interval. That is, it is possible to significantly reduce SU-MIMO beamforming time.

Differences from the existing SU-MIMO beamforming process are as follows.

4.3.1. SU-MIMO Beamforming Setup Subphase

Only an initiator transmits a MIMO beamforming setup frame, and a responder omits transmitting a MIMO beamforming setup frame. The MIMO beamforming setup frame transmitted by the initiator includes the following information.

i) The number of sector combinations to be used for beamforming during I-SMBT is indicated using a Number of TX Sector Combinations Requested subfield of a MIMO FBCK-REQ field.

ii) It is determined whether the responder requests feedback of a time-domain channel response using a Channel Measurement Requested subfield of the MIMO FBCK-REQ field.

iii) The number of TRN subfields to be used for reception AWV training during I-SMBT is indicated to the responder using an L-TX-RX field and a Requested EDMG TRN-Unit M field.

iv) One reserved bit in the MIMO beamforming setup frame is used. The bit equal to 1 indicates that the currently transmitted MIMO beamforming setup frame is a MIMO beamforming setup frame for SU-MIMO beamforming for a TDD SP and that the following beamforming process is a SU-MIMO beamforming processor for the TDD SP. The bit equal to 0 indicates the existing beamforming process, and the existing beamforming process is followed.

v) One reserved bit in the MIMO beamforming setup frame is used. When the bit is 1, the L-TX-RX field and the Requested EDMG TRN-Unit M field in the MIMO beamforming setup frame indicate information indicating the number of TRN subfields to be used by a STA receiving the MIMO beamforming setup frame to perform reception AWV training during the next SMBT. When the bit is 0, the L-TX-RX field and the Requested EDMG TRN-Unit M field in the MIMO beamforming setup frame indicate information for requesting the number of TRN subfields to be used by a STA transmitting the MIMO beamforming setup frame to perform reception AWV training during the next SMBT as in the existing process.

vi) To further simplify the SU-MIMO beamforming process for the TDD SP, information included in the MIMO beamforming setup frame may be included in the previous SLS or SISO beamforming process. In this case, the MIMO BF setup subphase is omitted from the SU-MIMO beamforming process illustrated above.

4.3.2 I-SMBT Subphase

Beamforming is performed by the same method as for existing I-SMBT based on the information indicated by the MIMO beamforming setup frame.

4.3.3 SU-MIMO Beamforming Feedback Subphase

The SU-MIMO beamforming feedback subphase is performed in the Rx TDD slot. The responder (DN/CN) transmits a MIMO beamforming feedback frame for the earliest Rx TDD slot among Rx TDD slots subsequently allocated for the responder after receiving the MIMO beamforming setup frame and BRP frames for SU-MIMO beamforming.

Alternatively, TDD slots are classified into a TDD slot for data transmission and a TDD slot for a response, such as an ACK, and the MIMO BF feedback frame is transmitted in the earliest TDD slot for a response, such as an ACK, among the TDD slots.

Figure 23:
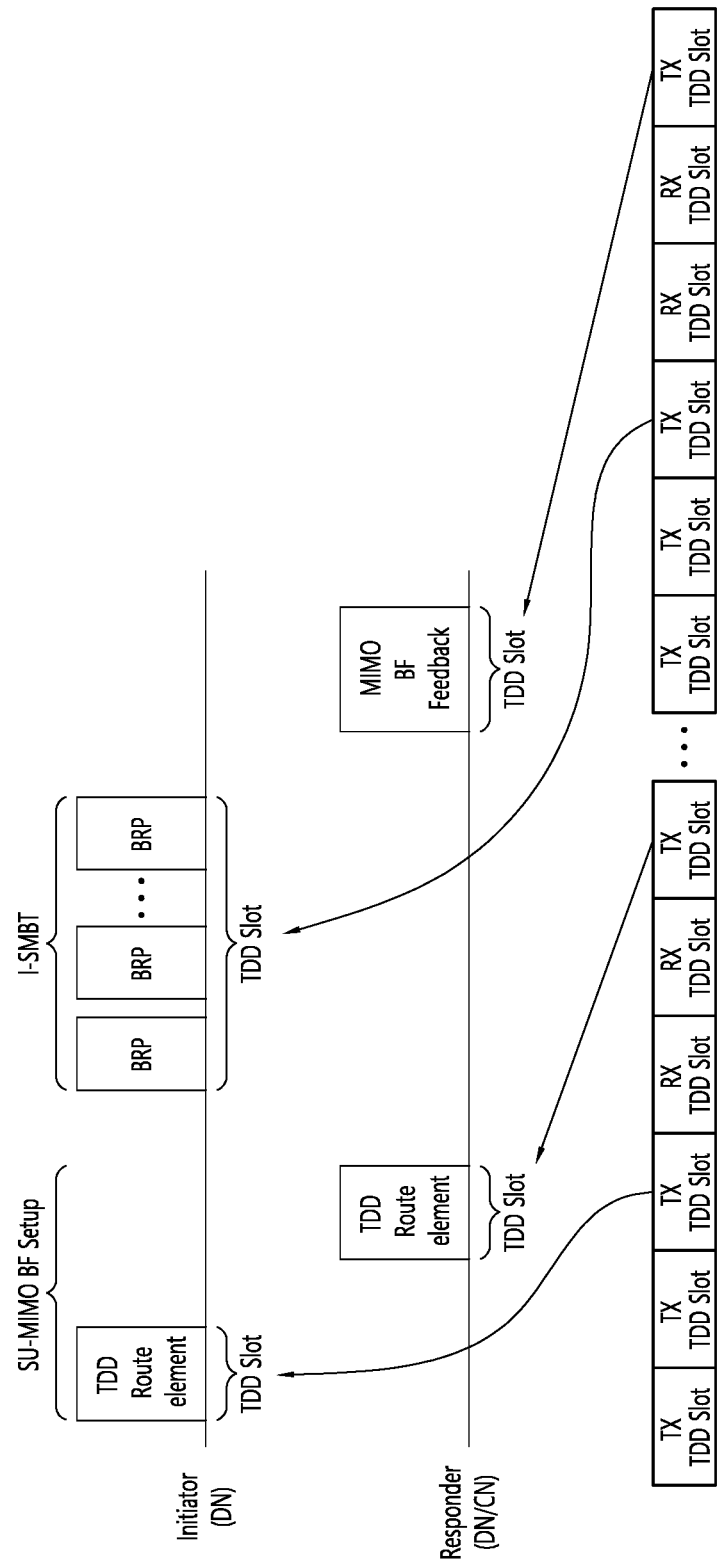
FIG. 23 illustrates still another example of a SU-MIMO beamforming process that can be applied to the disclosure.

FIG. 23 illustrates still another example of a SU-MIMO beamforming process that can be applied to the disclosure. FIG. 23 shows a method of including information included in a MIMO beamforming setup frame in a TDD route element for a SU-MIMO beamforming process for a TDD SP.

The TDD route element is an element included in a management frame transmitted after performing TDD beamforming, which is used like a conventional SLS, for initial beamforming. This element includes beamforming results with respect to a plurality of RF chains. Therefore, in order to perform SU-MIMO beamforming, a beamforming result with respect to each RF chain is essentially needed, and thus information about SU-MIMO beamforming setup may also be included in the element, thereby simplifying the SU-MIMO beamforming procedure in the TDD SP. A STA receiving the information about the SU-MIMO beamforming setup included in the TDD route element performs an operation for SU-MIMO beamforming, for example, turning on RF chains of the UE, based on a method indicated by SU-MIMO setup.

As described above, the information about MIMO setup is indicated via the TDD route element transmitted in the TDD beamforming process, thereby transmitting necessary information through a TDD slot for transmitting the TDD route element without needing to allocate a separate TDD slot for the SU-MIMO beamforming setup procedure.

Figure 24:
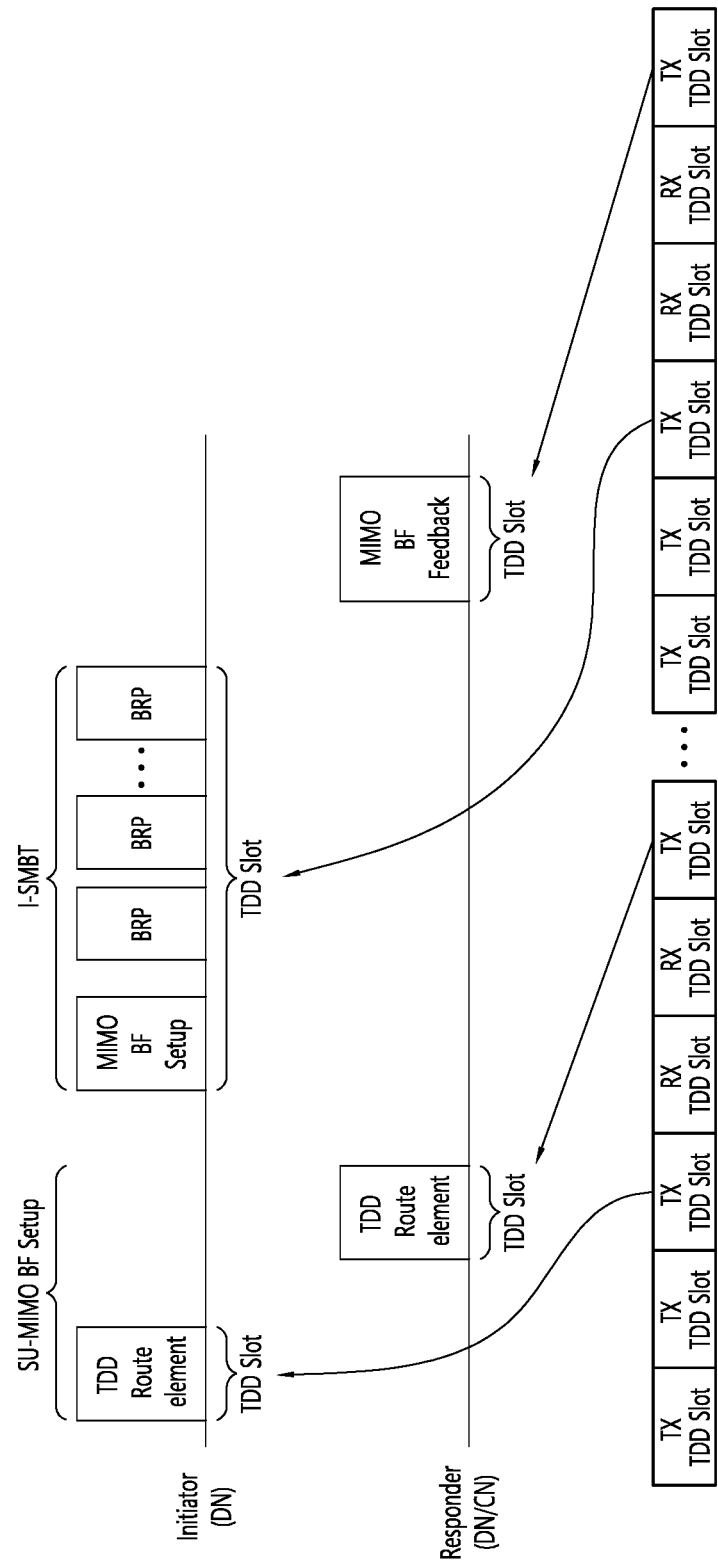
FIG. 24 illustrates yet another example of a SU-MIMO beamforming process that can be applied to the disclosure.

FIG. 24 illustrates yet another example of a SU-MIMO beamforming process that can be applied to the disclosure.

Referring to FIG. 24, unlike in FIG. 23, an initiator transmits a MIMO beamforming setup frame in the I-SMBT phase. However, when performing SU-MIMO beamforming, since a responder does not know a slot in which I-SMBT starts, a frame for providing preparation time may be transmitted via a BRP frame before starting SU-MIMO beamforming training. The MIMO beamforming setup frame illustrated in FIG. 24 is available, and any frame for providing preparation time is also available.

4.3.4. Expected Effect

Based on the foregoing methods for simplifying the procedure in a TDD SP in terms of time, as the number of CNs or DNs linked with a DN increases in a mmWave distributed network, a gain of saving time resources exponentially increases.

Figure 25:
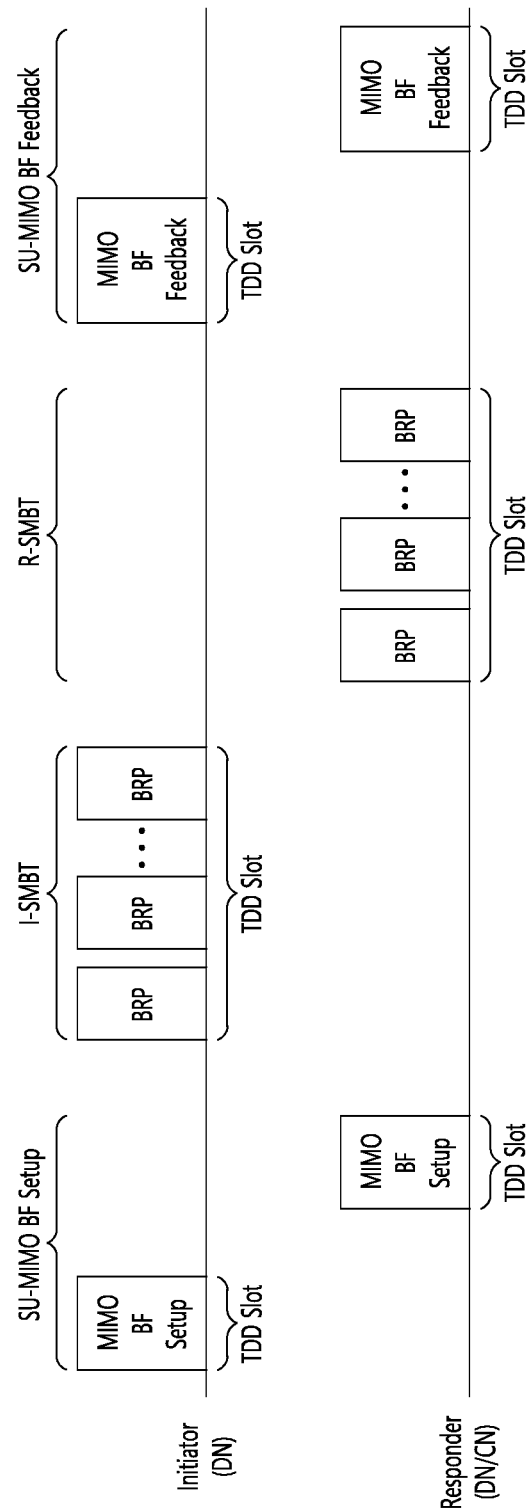
FIG. 25 illustrates an example of a non-reciprocal SU-MIMO beamforming process that can be applied to the disclosure.

4.5. Non-Reciprocal SU-MIMO Beamforming Procedure Available for TDD SP Structure FIG. 25 illustrates an example of a non-reciprocal SU-MIMO beamforming process that can be applied to the disclosure.

A SU-MIMO beamforming procedure includes a SU-MIMO beamforming setup subphase, an SMBT subphase, and a SU-MIMO beamforming feedback subphase. The subphases are apart from each other at an interval of an MBIFS.

The SU-MIMO beamforming setup subphase includes a handshaking process. A responder needs to receive a MIMO beamforming setup frame from an initiator and needs to transmit a MIMO beamforming setup frame to the initiator after SIFS.

The SU-MIMO beamforming feedback subphase also includes a handshaking process. The responder needs to receive a MIMO beamforming feedback frame from the initiator and needs to transmit a MIMO beamforming feedback frame to the initiator after SIFS.

The flows of the subphases and the exchanges of the MIMO beamforming setup frames and MIMO beamforming feedback frames need to be adapted to accommodate a TDD SP where bidirectional transmission is prohibited in a TDD slot.

4.5.1. Inter-Subphase

Each subphase starts at the earliest TDD slot after the previous subphase is completed.

4.5.2. Inner-Subphase

The responder needs to transmit the MIMO beamforming setup frame to the initiator at the earliest TDD slot that is allowed for transmission after receiving the MIMO beamforming setup frame from the initiator.

The responder needs to transmit the MIMO beamforming feedback frame to the initiator at the earliest TDD Slot that is allowed for transmission after receiving the MIMO beamforming feedback frame from the initiator.

After the previous subphase terminates, when the start point of the earliest allocated TDD slot is earlier than an MBIFS, a subsequent subphase may start after a lapse of an MBIFS.

After the responder receives the MIMO beamforming setup frame or MIMO beamforming feedback frame, when the start point of the earliest allocated TDD slot is earlier than an SIFS, a subsequent subphase may start after a lapse of an SIFS.

4.6. Reciprocal SU-MIMO Beamforming Procedure Available for TDD SP Structure

Figure 26:
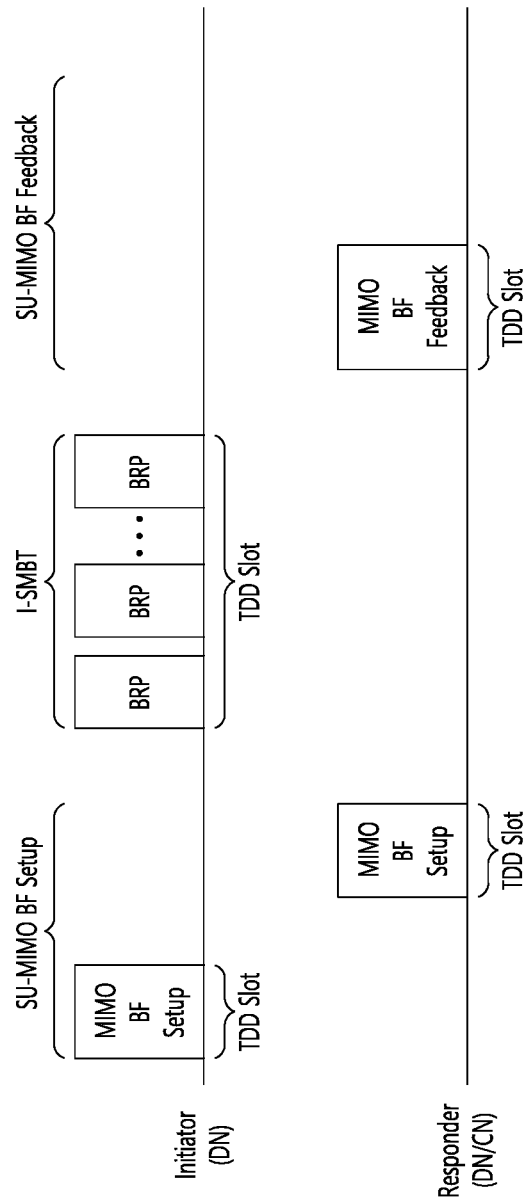
FIG. 26 illustrates an example of a reciprocal SU-MIMO beamforming process that can be applied to the disclosure.

FIG. 26 illustrates an example of a reciprocal SU-MIMO beamforming process that can be applied to the disclosure.

4.6.1. Inter-Subphases

Each subphase starts at the earliest TDD slot after the previous subphase is completed.

4.6.2. Inner-Subphase

A responder needs to transmit a MIMO beamforming setup frame to an initiator at the earliest TDD slot that is allowed for transmission after receiving a MIMO beamforming setup frame from the initiator.

After the previous subphase terminates, when the start point of the earliest allocated TDD slot is earlier than an MBIFS, a subsequent subphase may start after a lapse of an MBIFS.

After the responder receives the MIMO beamforming setup frame or MIMO beamforming feedback frame, when the start point of the earliest allocated TDD slot is earlier than an SIFS, a subsequent subphase may start after a lapse of an SIFS.

4.7. Expected Effect

Considering restriction of simple transmission in a Tx TDD slot and an Rx TDD slot, transmission in only one direction is allowed in one TDD slot.

Therefore, based on the proposed technology, it is possible to perform effective SU-MIMO beamforming in a TDD SP structure, receiving a minimal change in a channel. In order to perform MIMO beamforming, a STA uses a plurality of RF chains at the same time, thus causing an increase in power consumption. Based on the proposed technology, using an earliest TDD slot may minimize an increase in power consumption.

Figure 27:
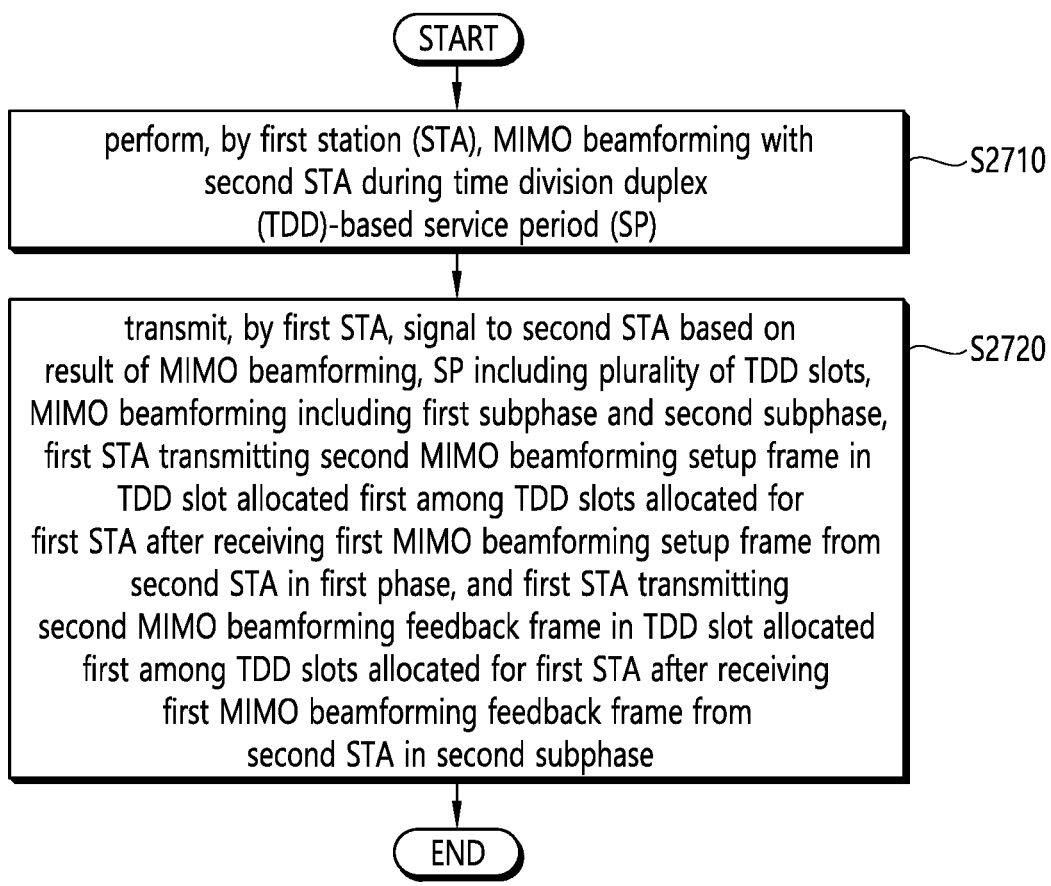
FIG. 27 is a flowchart illustrating a procedure for performing SU-MIMO beamforming available for a TDD SP structure according to an embodiment.

FIG. 27 is a flowchart illustrating a procedure for performing SU-MIMO beamforming available for a TDD SP structure based on an embodiment.

This embodiment proposes a method for transmitting a signal by performing MIMO beamforming even in a TDD SP in order to achieve a transmission rate required in 802.11ay.

First, terms are defined. A first STA may correspond to a responder that performs beamforming, and a second STA may correspond to an initiator that performs beamforming. MIMO beamforming described in this embodiment is performed between the first STA and the second STA and may thus correspond to single-user (SU)-MIMO beamforming. SU-MIMO beamforming includes four subphases (first to fourth subphases), which will be described in detail.

In operation 52710, the first STA performs MIMO beamforming with the second STA during a time division duplex (TDD)-based service period (SP).

In operation 52720, the first STA transmits a signal to the second STA based on the result of the MIMO beamforming.

The MIMO beamforming is described in detail below.

The SP includes a plurality of TDD slots. Specifically, the SP includes a plurality of TDD intervals, and one TDD interval includes a plurality of TDD slots. The plurality of TDD slots may include at least one Tx TDD slot for only transmitting a frame and at least one Rx TDD slot for only receiving a frame with respect to an initiator.

The MIMO beamforming includes a first subphase and a second subphase. In addition, the MIMO beamforming may further include a third subphase and a fourth subphase. The first subphase may be a SU-MIMO beamforming setup subphase. The second subphase may be a SU-MIMO beamforming feedback subphase. The third subphase may be an initiator-SU-MIMO beamforming training (I-SMBT) subphase. The fourth subphase may be a responder-SU-MIMO beamforming training (R-SMBT) subphase. The third subphase may follow the first subphase. The fourth subphase may follow the third subphase and may precede the second subphase.

An example of configuring a TDD slot in an inner-subphase is illustrated as follows.

In the first subphase, after receiving a first MIMO beamforming setup frame from the second STA, the first STA transmits a second MIMO beamforming setup frame in a (earliest) TDD slot allocated first among TDD slots allocated for the first STA. That is, in the first subphase, a TDD slot for transmitting and receiving a MIMO beamforming setup frame may be determined to efficiently perform MIMO beamforming in terms of time and power.

In the second subphase, after receiving a first MIMO beamforming feedback frame from the second STA, the first STA transmits a second MIMO beamforming feedback frame in a (earliest) TDD slot allocated first among TDD slots allocated for the first STA. That is, in the first subphase, a TDD slot for transmitting and receiving a MIMO beamforming feedback frame may be determined to efficiently perform MIMO beamforming in terms of time and power.

Further, an example of configuring a TDD slot in an inter-subphase is illustrated as follows.

After the second STA receives the second MIMO beamforming setup frame from the first STA, the second STA may transmit a first beam refinement protocol (BRP) frame in a (earliest) TDD slot allocated first among TDD slots allocated for the second STA in the third subphase. That is, after transmission/reception of the last frame in the first subphase is completed, the third subphase may start in the first allocated TDD slot.

After the first STA receives the first BRP frame from the second STA, the first STA may transmit a second BRP frame in a (earliest) TDD slot allocated first among TDD slots allocated for the first STA in the fourth subphase. That is, after transmission/reception of the last frame of the third subphase is completed, the fourth subphase may start in the first allocated TDD slot.

After the second STA receives the second BRP frame from the first STA, the second STA may transmit the first MIMO beamforming feedback frame in a (earliest) TDD slot allocated first among TDD slots allocated for the second STA in the second subphase. That is, after transmission/reception of the last frame in the fourth subphase is completed, the second subphase may start in the first allocated TDD slot.

Further, the third subphase may start after a lapse of a medium beamforming inter-frame space (MBIFS) from the end of the first subphase. The fourth subphase may start after a lapse of an MBIFS from the end of the third subphase. The second subphase may start after a lapse of an MBIFS from the end of the fourth subphase. After a subphase terminates, even though the start point of a first allocated (earliest) TDD slot is earlier than (comes before) an MBIFS, a subsequent subphase may start after a lapse of an MBIFS from when the subphase terminates.

When the first BRP frame includes a plurality of BRP frames, the plurality of BRP frames may be separately transmitted at an interval of a short inter-frame space (SIFS) within one TDD slot.

In addition, when the second BRP frame includes a plurality of BRP frames, the plurality of BRP frames may be separately transmitted with an interval of an SIFS within one TDD slot.

The plurality of TDD slots may be determined by a TDD slot structure element. The TDD slots allocated for the first STA and the TDD slots allocated for the second STA may be determined by a TDD slot schedule element. The TDD slot structure element and the TDD slot schedule element may be received from the second STA.

This embodiment may operate based on a non-reciprocal SU-MIMO beamforming procedure.

This embodiment may also operate based on a reciprocal SU-MIMO beamforming procedure.

Based on the reciprocal SU-MIMO beamforming procedure, the first STA and the second STA supporting a TDD SP know each other's numbers of Tx/Rx sectors. In addition, the first STA and the second STA supporting the TDD SP may support reciprocity of an antenna pattern. Accordingly, the STAs may simplify the reciprocal SU-MIMO beamforming procedure using this reciprocity, compared to the non-reciprocal SU-MIMO beamforming procedure.

For example, the second STA may perform transmissions in the SU-MIMO beamforming setup subphase and the I-SMBT subphase within one Tx TDD slot. The first STA may transmit a MIMO beamforming feedback frame in an allocated Rx TDD slot following the Tx TDD slot. That is, beamforming may be completed using at least two TDD slots within one TDD interval. Further, in the SU-MIMO beamforming setup subphase, only the second STA may transmit a MIMO beamforming setup frame, and the first STA may not transmit (may omit transmitting) a MIMO beamforming setup frame.

In the SU-MIMO beamforming feedback subphase, the first STA may transmit a MIMO beamforming feedback frame in an Rx TDD slot allocated first among Rx TDD slots allocated after receiving a MIMO beamforming setup frame and a BRP frame in the previous subphase.

The first STA and the second STA supporting the TDD SP may transmit information about a MIMO beamforming setup frame via a TDD route element. The TDD route element may include beamforming results with respect to a plurality of RF chains. In order to perform SU-MIMO beamforming, a beamforming result with respect to each RF chain is essentially needed, and thus the information about the MIMO beamforming setup frame may be included in the TDD route element, thereby simplifying the SU-MIMO beamforming procedure. Accordingly, it is possible to significantly reduce time for SU-MIMO beamforming in a TDD SP.

Figure 28:
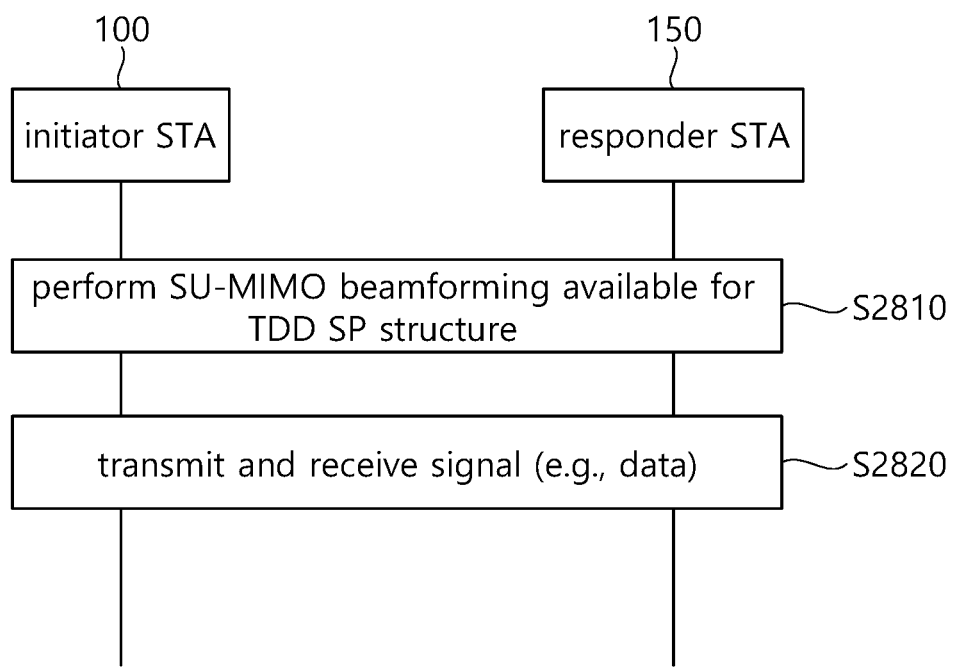
FIG. 28 illustrates a procedure for transmitting and receiving a signal by performing SU-MIMO beamforming available for a TDD SP structure according to an embodiment.

FIG. 28 illustrates a procedure for transmitting and receiving a signal by performing SU-MIMO beamforming available for a TDD SP structure according to an embodiment.

First, terms are defined. A first STA may correspond to a responder STA 150 that performs beamforming, and a second STA may correspond to an initiator STA 100 that performs beamforming. MIMO beamforming described in this embodiment is performed between the initiator STA and the responder STA and may thus correspond to single-user (SU)-MIMO beamforming. SU-MIMO beamforming includes four subphases (first to fourth subphases), which will be described in detail.

In operation 52810, the initiator STA performs SU-MIMO beamforming available for a TDD SP structure with the responder STA.

In operation 52820, the initiator STA transmits and receives a signal to and from the responder STA based on the result of the SU-MIMO beamforming.

The MIMO beamforming is described in detail below (In the following description, the responder STA is referred to as the first STA and the initiator STA is referred to as the second STA).

The SP includes a plurality of TDD slots. Specifically, the SP includes a plurality of TDD intervals, and one TDD interval includes a plurality of TDD slots. The plurality of TDD slots may include at least one Tx TDD slot for only transmitting a frame and at least one Rx TDD slot for only receiving a frame with respect to an initiator.

The MIMO beamforming includes a first subphase and a second subphase. In addition, the MIMO beamforming may further include a third subphase and a fourth subphase. The first subphase may be a SU-MIMO beamforming setup subphase. The second subphase may be a SU-MIMO beamforming feedback subphase. The third subphase may be an initiator-SU-MIMO beamforming training (I-SMBT) subphase. The fourth subphase may be a responder-SU-MIMO beamforming training (R-SMBT) subphase. The third subphase may follow the first subphase. The fourth subphase may follow the third subphase and may precede the second subphase.

An example of configuring a TDD slot in an inner-subphase is illustrated as follows.

In the first subphase, after receiving a first MIMO beamforming setup frame from the second STA, the first STA transmits a second MIMO beamforming setup frame in a TDD slot allocated first among TDD slots allocated for the first STA. That is, in the first subphase, a TDD slot for transmitting and receiving a MIMO beamforming setup frame may be determined to efficiently perform MIMO beamforming in terms of time and power.

In the second subphase, after receiving a first MIMO beamforming feedback frame from the second STA, the first STA transmits a second MIMO beamforming feedback frame in a TDD slot allocated first among TDD slots allocated for the first STA. That is, in the first subphase, a TDD slot for transmitting and receiving a MIMO beamforming feedback frame may be determined to efficiently perform MIMO beamforming in terms of time and power.

Further, an example of configuring a TDD slot in an inter-subphase is illustrated as follows.

After the second STA receives the second MIMO beamforming setup frame from the first STA, the second STA may transmit a first beam refinement protocol (BRP) frame in a TDD slot allocated first among TDD slots allocated for the second STA in the third subphase. That is, after transmission/reception of the last frame in the first subphase is completed, the third subphase may start in the first allocated TDD slot.

After the first STA receives the first BRP frame from the second STA, the first STA may transmit a second BRP frame in a TDD slot allocated first among TDD slots allocated for the first STA in the fourth subphase. That is, after transmission/reception of the last frame of the third subphase is completed, the fourth subphase may start in the first allocated TDD slot.

After the second STA receives the second BRP frame from the first STA, the second STA may transmit the first MIMO beamforming feedback frame in a TDD slot allocated first among TDD slots allocated for the second STA in the second subphase. That is, after transmission/reception of the last frame in the fourth subphase is completed, the second subphase may start in the first allocated TDD slot.

Further, the third subphase may start after a lapse of a medium beamforming inter-frame space (MBIFS) from the end of the first subphase. The fourth subphase may start after a lapse of an MBIFS from the end of the third subphase. The second subphase may start after a lapse of an MBIFS from the end of the fourth subphase. After a subphase terminates, even though the start point of a first allocated TDD slot is earlier than (comes before) an MBIFS, a subsequent subphase may start after a lapse of an MBIFS from when the subphase terminates.

When the first BRP frame includes a plurality of BRP frames, the plurality of BRP frames may be separately transmitted at an interval of a short inter-frame space (SIFS) within one TDD slot.

In addition, when the second BRP frame includes a plurality of BRP frames, the plurality of BRP frames may be separately transmitted with an interval of an SIFS within one TDD slot.

The plurality of TDD slots may be determined by a TDD slot structure element. The TDD slots allocated for the first STA and the TDD slots allocated for the second STA may be determined by a TDD slot schedule element. The TDD slot structure element and the TDD slot schedule element may be received from the second STA.

5. Device Configuration

Figure 29:
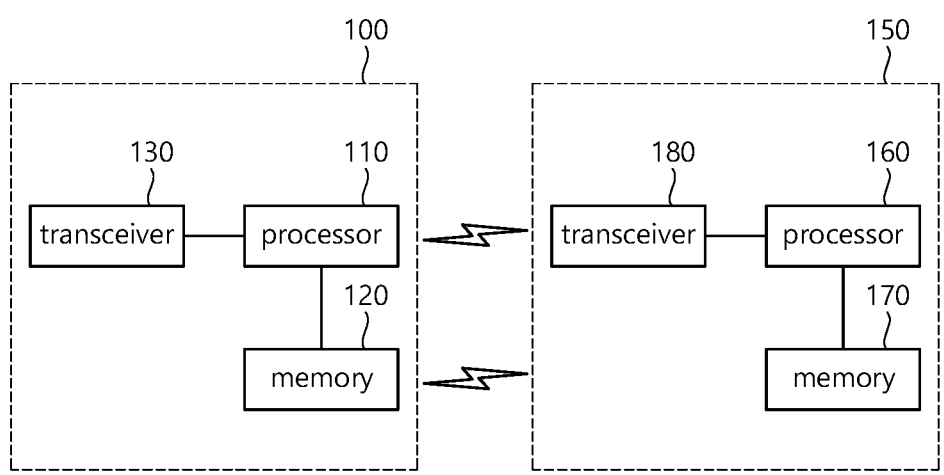
FIG. 29 is a diagram showing a device for implementing the above-described method.

FIG. 29 is a diagram showing a device for implementing the above-described method.

A wireless device (100) of FIG. 29 may correspond to an initiator STA, which transmits a signal that is described in the description presented above, and a wireless device (150) may correspond to a responder STA, which receives a signal that is described in the description presented above. Here, each station may correspond to a 11ay device (or user equipment (UE)) or a PCP/AP. Hereinafter, for simplicity in the description of the disclosure, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and the like. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and the like) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement functions, processes, and/or methods proposed in the present specification.

For example, the processor (110, 160) may perform the aforementioned operation according to the present embodiment.

The specific operation of the processor 110 of the transmitting device is as follows. The processor 110 of the transmitting device performs MIMO beamforming with a second STA during a time division duplex (TDD)-based service period (SP), and transmits and receives a signal based on the result of the MIMO beamforming.

The specific operation of the processor 160 of the receiving device is as follows. The processor 160 of the receiving device performs MIMO beamforming with the second STA during a time division duplex (TDD)-based service period (SP), and transmits and receives a signal based on the result of the MIMO beamforming.

The MIMO beamforming is described in detail below.

The SP includes a plurality of TDD slots. Specifically, the SP includes a plurality of TDD intervals, and one TDD interval includes a plurality of TDD slots. The plurality of TDD slots may include at least one Tx TDD slot for only transmitting a frame and at least one Rx TDD slot for only receiving a frame with respect to an initiator.

The MIMO beamforming includes a first subphase and a second subphase. In addition, the MIMO beamforming may further include a third subphase and a fourth subphase. The first subphase may be a SU-MIMO beamforming setup subphase. The second subphase may be a SU-MIMO beamforming feedback subphase. The third subphase may be an initiator-SU-MIMO beamforming training (I-SMBT) subphase. The fourth subphase may be a responder-SU-MIMO beamforming training (R-SMBT) subphase. The third subphase may follow the first subphase. The fourth subphase may follow the third subphase and may precede the second subphase.

An example of configuring a TDD slot in an inner-subphase is illustrated as follows.

In the first subphase, after receiving a first MIMO beamforming setup frame from the second STA, the first STA transmits a second MIMO beamforming setup frame in a TDD slot allocated first among TDD slots allocated for the first STA. That is, in the first subphase, a TDD slot for transmitting and receiving a MIMO beamforming setup frame may be determined to efficiently perform MIMO beamforming in terms of time and power.

In the second subphase, after receiving a first MIMO beamforming feedback frame from the second STA, the first STA transmits a second MIMO beamforming feedback frame in a TDD slot allocated first among TDD slots allocated for the first STA. That is, in the first subphase, a TDD slot for transmitting and receiving a MIMO beamforming feedback frame may be determined to efficiently perform MIMO beamforming in terms of time and power.

Further, an example of configuring a TDD slot in an inter-subphase is illustrated as follows.

After the second STA receives the second MIMO beamforming setup frame from the first STA, the second STA may transmit a first beam refinement protocol (BRP) frame in a TDD slot allocated first among TDD slots allocated for the second STA in the third subphase. That is, after transmission/reception of the last frame in the first subphase is completed, the third subphase may start in the first allocated TDD slot.

After the first STA receives the first BRP frame from the second STA, the first STA may transmit a second BRP frame in a TDD slot allocated first among TDD slots allocated for the first STA in the fourth subphase. That is, after transmission/reception of the last frame of the third subphase is completed, the fourth subphase may start in the first allocated TDD slot.

After the second STA receives the second BRP frame from the first STA, the second STA may transmit the first MIMO beamforming feedback frame in a TDD slot allocated first among TDD slots allocated for the second STA in the second subphase. That is, after transmission/reception of the last frame in the fourth subphase is completed, the second subphase may start in the first allocated TDD slot.

Further, the third subphase may start after a lapse of a medium beamforming inter-frame space (MBIFS) from the end of the first subphase. The fourth subphase may start after a lapse of an MBIFS from the end of the third subphase. The second subphase may start after a lapse of an MBIFS from the end of the fourth subphase. After a subphase terminates, even though the start point of a first allocated TDD slot is earlier than (comes before) an MBIFS, a subsequent subphase may start after a lapse of an MBIFS from when the subphase terminates.

When the first BRP frame includes a plurality of BRP frames, the plurality of BRP frames may be separately transmitted at an interval of a short inter-frame space (SIFS) within one TDD slot.

In addition, when the second BRP frame includes a plurality of BRP frames, the plurality of BRP frames may be separately transmitted with an interval of an SIFS within one TDD slot.

The plurality of TDD slots may be determined by a TDD slot structure element. The TDD slots allocated for the first STA and the TDD slots allocated for the second STA may be determined by a TDD slot schedule element. The TDD slot structure element and the TDD slot schedule element may be received from the second STA.

What is claimed is:

1. A method for transmitting a signal by performing multiple-input multiple-output (MIMO) beamforming in a wireless local area network (WLAN) system, the method comprising:

performing, by a first station (STA), MIMO beamforming with a second STA during a time division duplex (TDD)-based service period (SP); and transmitting, by the first STA, a signal to the second STA based on a result of the MIMO beamforming, wherein the SP comprises a plurality of TDD slots, the MIMO beamforming comprises a first subphase, a second subphase, a third subphase and a fourth subphase, the first STA transmits a second MIMO beamforming setup frame in a TDD slot allocated first among TDD slots allocated for the first STA after receiving a first MIMO beamforming setup frame from the second STA in the first subphase, the first STA transmits a second MIMO beamforming feedback frame in the TDD slot allocated first among TDD slots allocated for the first STA after receiving a first MIMO beamforming feedback frame from the second STA in the second subphase, the third subphase follows the first subphase, the fourth subphase follows the third subphase and precedes the second subphase, the second STA transmits a first beam refinement protocol (BRP) frame in a TDD slot allocated first among TDD slots allocated for the second STA in the third subphase, after receiving the second MIMO beamforming setup frame from the first STA, the first STA transmits a second BRP frame in a TDD slot allocated first among TDD slots allocated for the first STA in the fourth subphase after receiving the first BRP frame from the second STA, and the second STA transmits the first MIMO beamforming feedback frame in the TDD slot allocated first among the TDD slots allocated for the second STA in the second subphase after receiving the second BRP frame from the first STA.

2. The method of claim 1, wherein, when the first BRP frame comprises a plurality of BRP frames, the plurality of BRP frames is separately transmitted at an interval of a short inter-frame space (SIFS) within one TDD slot.

3. The method of claim 1, wherein, when the second BRP frame comprises a plurality of BRP frames, the plurality of BRP frames is separately transmitted at an interval of an SIFS within one TDD slot.

4. The method of claim 1, wherein the plurality of TDD slots is determined by a TDD slot structure element, the TDD slots allocated for the first STA and the TDD slots allocated for the second STA are determined by a TDD slot schedule element, and the TDD slot structure element and the TDD slot schedule element are received from the second STA.

5. The method of claim 1, wherein the first subphase is a single user (SU)-MIMO beamforming setup subphase, the second subphase is a SU-MIMO beamforming feedback subphase, the third subphase is an initiator-SU-MIMO beamforming training (I-SMBT) subphase, and the fourth subphase is a responder-SU-MIMO beamforming training (R-SMBT) subphase.

6. The method of claim 5, wherein the third subphase starts after a lapse of a medium beamforming inter-frame space (MBIFS) from an end of the first subphase, the fourth subphase starts after a lapse of an MBIFS from an end of the third subphase, and the second subphase starts after a lapse of an MBIFS from an end of the fourth subphase.

7. A first station (STA) for transmitting a signal by performing multiple-input multiple-output (MIMO) beamforming in a wireless local area network (WLAN) system, the first STA comprising:

a transceiver configured to comprise one or more radio frequency (RF) chains and to transmit and receive the signal to and from a second STA; and a processor configured to be connected to the transceiver and to process the signal transmitted to and received from the second STA, wherein the processor is configured to:

perform MIMO beamforming with a second STA during a time division duplex (TDD)-based service period (SP), and transmit the signal to the second STA based on a result of the MIMO beamforming, the SP comprises a plurality of TDD slots, the MIMO beamforming comprises a first subphase, a second subphase, a third subphase and a fourth subphase, the first STA transmits a second MIMO beamforming setup frame in a TDD slot allocated first among TDD slots allocated for the first STA after receiving a first MIMO beamforming setup frame from the second STA in the first subphase, the first STA transmits a second MIMO beamforming feedback frame in the TDD slot allocated first among TDD slots allocated for the first STA after receiving a first MIMO beamforming feedback frame from the second STA in the second subphase, the third subphase follows the first subphase, the fourth subphase follows the third subphase and precedes the second subphase, the second STA transmits a first beam refinement protocol (BRP) frame in a TDD slot allocated first among TDD slots allocated for the second STA in the third subphase, after receiving the second MIMO beamforming setup frame from the first STA, the first STA transmits a second BRP frame in a TDD slot allocated first among TDD slots allocated for the first STA in the fourth subphase after receiving the first BRP frame from the second STA, and the second STA transmits the first MIMO beamforming feedback frame in the TDD slot allocated first among the TDD slots allocated for the second STA in the second subphase after receiving the second BRP frame from the first STA.

8. The first STA of claim 7, wherein, when the first BRP frame comprises a plurality of BRP frames, the plurality of BRP frames is separately transmitted at an interval of a short inter-frame space (SIFS) within one TDD slot.

9. The first STA of claim 7, wherein, when the second BRP frame comprises a plurality of BRP frames, the plurality of BRP frames is separately transmitted at an interval of an SIFS within one TDD slot.

10. The first STA of claim 7, wherein the plurality of TDD slots is determined by a TDD slot structure element, the TDD slots allocated for the first STA and the TDD slots allocated for the second STA are determined by a TDD slot schedule element, and the TDD slot structure element and the TDD slot schedule element are received from the second STA.

11. The first STA of claim 7, wherein the first subphase is a single user (SU)-MIMO beamforming setup subphase, the second subphase is a SU-MIMO beamforming feedback subphase, the third subphase is an initiator-SU-MIMO beamforming training (I-SMBT) subphase, and the fourth subphase is a responder-SU-MIMO beamforming training (R-SMBT) subphase.

12. The first STA of claim 11, wherein the third subphase starts after a lapse of a medium beamforming inter-frame space (MBIFS) from an end of the first subphase, the fourth subphase starts after a lapse of an MBIFS from an end of the third subphase, and the second subphase starts after a lapse of an MBIFS from an end of the fourth subphase.

* * * * *